United States Patent
Chen et al.

(10) Patent No.: US 7,792,377 B2
(45) Date of Patent: Sep. 7, 2010

(54) METHOD OF IMAGE AUTHENTICATION AND RESTORATION

(75) Inventors: Chao-Ho Chen, Tai-Nan (TW); Chung-Yih Lee, Taipei (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 798 days.

(21) Appl. No.: 11/740,257

(22) Filed: Apr. 25, 2007

(65) Prior Publication Data

US 2008/0267520 A1  Oct. 30, 2008

(51) Int. Cl.
G06K 9/00 (2006.01)
G06K 9/36 (2006.01)
G06K 9/46 (2006.01)

(52) U.S. Cl. .................. 382/250; 382/100; 382/254

(58) Field of Classification Search .................. 382/100, 382/162, 164, 167, 173, 178, 190, 195, 232, 382/250, 254, 258, 266; 345/589, 591, 600–604; 358/3.28, 515, 518, 523, 525, 530; 713/168, 713/170, 171, 176, 179; 380/201, 202; 283/902; 386/94

See application file for complete search history.

(56) References Cited

U.S. PATENT DOCUMENTS

| | | | |
|---|---|---|---|
| 6,275,599 B1 * | 8/2001 | Adler et al. | 382/100 |
| 6,810,131 B2 * | 10/2004 | Nakagawa et al. | 382/100 |
| 6,882,728 B1 * | 4/2005 | Takahashi et al. | 380/201 |
| 6,895,101 B2 * | 5/2005 | Celik et al. | 382/100 |
| 6,901,862 B2 * | 6/2005 | Yamaguchi et al. | 101/483 |
| 6,941,460 B2 * | 9/2005 | Carro et al. | 713/170 |
| 7,146,502 B2 * | 12/2006 | Hayashi | 713/176 |
| 7,295,678 B2 * | 11/2007 | Petitjean | 382/100 |
| 7,561,714 B2 * | 7/2009 | Tian et al. | 382/100 |
| 2004/0071311 A1 * | 4/2004 | Choi et al. | 382/100 |
| 2005/0175215 A1 * | 8/2005 | Machida | 382/100 |
| 2008/0267520 A1 * | 10/2008 | Chen et al. | 382/250 |

* cited by examiner

Primary Examiner—Amir Alavi
(74) Attorney, Agent, or Firm—Winston Hsu

(57) ABSTRACT

A method of effective image authentication and image restoration by hiding watermarks in DCT (Discrete Cosine Transform) coefficients is presented. The basic concept is to embed the selected significant watermarking bits for authentication and restoration into the selected medium- and low-frequency DCT coefficients. Thus, the illegally tampered regions can be detected, and then the original information in that region can be extracted for restoration. Experimental results show that the proposed authentication and restoration techniques can be applied to a DVR (Digital Video Recorder) system, in which no original image information is involved, and it can effectively detect the illegally tampered region and restore the tampered region in the human visual perceptual quality by only using a little embedded original information.

3 Claims, 32 Drawing Sheets

| 146 | 157 | 166 | 162 | 162 | 154 | 149 | 144 |
|-----|-----|-----|-----|-----|-----|-----|-----|
| 145 | 161 | 164 | 159 | 160 | 148 | 145 | 149 |
| 149 | 164 | 158 | 155 | 158 | 144 | 143 | 149 |
| 157 | 163 | 157 | 154 | 146 | 139 | 140 | 150 |
| 158 | 160 | 158 | 143 | 123 | 134 | 140 | 148 |
| 155 | 161 | 159 | 142 | 122 | 141 | 148 | 147 |
| 156 | 163 | 157 | 152 | 141 | 143 | 148 | 147 |
| 151 | 159 | 154 | 151 | 140 | 142 | 143 | 145 |

Fig. 7 Prior art

| 179 | -19 | 12 | 5 | -5 | -9 | -3 | 1 |
| --- | --- | --- | --- | --- | --- | --- | --- |
| 41 | 7 | -10 | -1 | 3 | 0 | -2 | -1 |
| 6 | 27 | -22 | -9 | 1 | 5 | 1 | 0 |
| -28 | -1 | 6 | 2 | 0 | -5 | 1 | -1 |
| -12 | -7 | 0 | 11 | 3 | -4 | -4 | -1 |
| -5 | 10 | -1 | -10 | 3 | 1 | 1 | 1 |
| -2 | 2 | -2 | -6 | 3 | 3 | 1 | 1 |
| -4 | -8 | 3 | 1 | -1 | -1 | 0 | -1 |

Fig. 8 Prior art

| 99 | 103 | 100 | 112 | 98 | 95 | 92 | 72 |
|---|---|---|---|---|---|---|---|
| 101 | 120 | 121 | 103 | 87 | 78 | 64 | 49 |
| 92 | 113 | 104 | 81 | 64 | 55 | 35 | 24 |
| 77 | 103 | 109 | 68 | 56 | 37 | 22 | 18 |
| 62 | 80 | 87 | 51 | 29 | 22 | 17 | 14 |
| 56 | 69 | 57 | 40 | 24 | 16 | 13 | 14 |
| 55 | 60 | 58 | 26 | 19 | 14 | 12 | 12 |
| 61 | 51 | 40 | 24 | 16 | 10 | 11 | 16 |

Fig. 9 Prior art

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | -1 | -1 | 0 | 0 | 0 | 0 | 0 |
| -2 | 1 | 2 | 0 | 0 | 0 | 0 | 0 |
| 11 | 3 | 0 | -2 | -1 | 0 | 0 | 0 |

Fig. 10 Prior art

| 1 | 0 | 0 | 0 | 0 | 0 | 0 | 0 |
|---|---|---|---|---|---|---|---|
| 2 | 1 | 0 | 0 | 0 | 0 | 0 | 0 |
| 3 | 2 | 1 | 0 | 0 | 0 | 0 | 0 |
| 4 | 4 | 3 | 1 | 0 | 0 | 0 | 0 |
| 5 | 5 | 4 | 3 | 1 | 0 | 0 | 0 |
| 7 | 5 | 5 | 4 | 3 | 1 | 0 | 0 |
| 7 | 6 | 5 | 5 | 4 | 2 | 1 | 0 |
| 7 | 7 | 6 | 5 | 4 | 3 | 2 | 1 |

Fig. 11 Prior art

METHOD OF IMAGE AUTHENTICATION AND RESTORATION

BACKGROUND OF THE INVENTION

1. Field of the Invention

The present invention relates to a method for performing image authentication and restoration, and more specifically, to a method for performing image authentication and restoration by hiding watermarking bits in DCT (Discrete Cosine Transform) coefficients.

2. Description of the Prior Art

Information hiding technology involves hiding information behind other information. For example, words, images, video and audio can be hidden in information such as documents, certificates, pictures, music, and advertisements. Information hiding technology can be applied in copyright protection, information authentication, annotation implantation, covert communications, multiple authorization, and so on.

Information hiding technology comprises two significant dimensions: digital watermarking and digital fingerprinting.

Digital watermarking involves hiding information related to intellectual property, such as authors, publishers, and/or company addresses, behind digital medium products.

Digital fingerprinting involves assigning serial numbers to different products. When the products are copied or shared illegally, makers can be identified according to the hidden serial numbers.

In fact, digital watermarking can be regarded as adding noise to original signals.

In recent years, digital watermarking technology has become widely adopted in tampering detection and copyright protection. There are many multimedia editing products present on the market. The said products utilize novel techniques and convenient editing tools to make it easy for a user to edit still or dynamic images. As a result, protecting original image information and preventing illegal tampering of the original images should be a concern.

A good watermark must conform to the following conditions:

1. Invisible: When watermarking information is embedded into original images, differences before and after embedding the watermarking information should not be readily apparent, nor should the watermarking information be easily extracted or damaged. Therefore, the watermarking information must be invisible to prevent it from being tampered with and to retain the details of the original images. For the said purposes, HVS (Human Vision System) and JND ((just Noticeable Difference) techniques are utilized to hide the watermarking information behind the original images.

2. Robustness: Watermarking information should be detectable after performing a signal (or geometry) processing procedure. Demands for robustness of the watermarking information depend on application. For example, the robustness demand on the watermarking information for copyright protection is higher than for image authentication. That is to say, the copyright owner should still be identifiable via the watermarking information for copyright protection even after the watermarking information has been maliciously tampered with repeatedly.

3. Security: The watermarking information may be extracted and further tampered with or copied. Therefore, the watermarking information must be encrypted to prevent extraction, and then be hidden in the original image.

4. Undeletable: The watermarking information must be embedded tightly into the original images. In other words, the watermarking information cannot be easily erasable through common signal processing methods. For most watermarking information in image authentication, once the watermarking information is removed, the original images become useless and untrustworthy.

In fact, the conditions a watermark should have depend on its characteristic. Logo watermarks can be grouped into two types: visible and invisible. For the invisible logo watermark, robustness is necessary. For an image-authentication watermark, semi-fragility is necessary.

In digital information protection, fragile watermarking, robust watermarking, and semi-fragile watermarking methods are utilized for image authentication and copyright protection.

Watermarking research comprises tampering detection for images in space or frequency domains and tampering detection for image compression. In general, tampering detection comprises vector-quantified technology, cryptography, and amplitude phase shift.

In the above-mentioned watermarking research, a tampered image detection method based on wavelet transform technology is a representative application. The said method utilizes hiding a low frequency part of an image in a high frequency part as an image authentication reference.

Another similar method involves extracting a meaningful part of the image as a watermark, hiding the meaningful part in a frequency domain of the image, and performing tampering detection via a table look-up method.

Another similar method utilizes correlations of image blocks as a reference for image authentication. This method demonstrates that the correlations of the image blocks remain unchanged before and after image compression. As a result, a watermark based on the method can be robust to JPEG compression. However, the structural characteristic of the image cannot be showed according to the method as the feature information of the image is extracted by selecting two blocks of the image at random.

An improved method involves generating SDS (Structural Digital Signature) in multi-resolution-wavelet-transformed information. SDS is robust to image filtering, image compression, and image zooming. Therefore, it can be detected easily even if an image has been tampered with.

Furthermore, another method provides a Stego-JPEG watermark based on a JPEG compression system. It can be applied in compressed videos based on DCT technology, such as MPEG series. Another method related to the said methods is to generate digital signatures in an image after encrypting feature information of the image. During image authentication, the encrypted feature information is extracted for comparison with the feature information of the selected image. A block that cannot be compared correctly is considered a tampered block. This method is robust to high quality JPEG compression due to the preservation of feature information.

A hierarchical detection method was disclosed in 2005. This method utilizes three detecting blocks (2×2, 4×4, 12×12) to execute a hierarchical detection, so that undetected tampered blocks in a first detection can be detected in second or third detections. This method increases detecting efficiency, but also increases the probability of erroneous detection.

It should be mentioned that there are five different types of image attacks. More detailed descriptions are provided as follows.

1. Removal attack: Authentication information hidden in an image is removed. Through statistic analysis, all possible authentication information is regarded as noise, and then removed. As a result, during image authentication, no related authentication information can be extracted from the image.

2. Geometric attack: Basic image processing techniques are utilized to destroy correlations of pixels in an image. This results in failure of image authentication. Common methods based on geometric attack comprise displacing, trimming, filtering, substituting, zooming, rotating, deleting columns or rows, and so on.

3. Cryptography attack: The position and content of the embedded watermark are predicted through an enumerating or brute-force method. Once the authentication information is decrypted, the embedded watermark is removed or modified easily.

4. System protocol attack: It involves embedding additional authentication information into an image so as to invalidate the original authentication information.

5. Other attacks: Compression, quantification, or format transformation may also cause loss of authentication information.

A logo watermark should be robust to every image attack mentioned above. However, for the logo watermark, it is still usable as long as it can be identified by the naked eye. On the contrary, an image authentication watermark must be robust to image attacks that cause damage to an image.

Many image authentication methods have been disclosed in recent years. A method of image authentication based on wavelet transform technology was disclosed in 1999. This method involves detecting image variations in space and frequency domains, and marking tampered blocks to determine the accuracy of the image. More description for this method is provided as follows.

(1) Parameter Definition:

f(m, n): Original image;

$L \in Z^+$: Maximum order of wavelet transform;

$f_{k,l}(m, n)$: Wavelet coefficient, k=h, v, d, a; l=1, 2, ..., L;

$f_{a,L}(m, n)$: Wavelet coefficient of the maximum order and the minimum frequency;

w(i): Validation key, i=1, ..., Nw;

ckey(i): Coefficient selection key, i=1, ..., Nw;

qkey(i): Quantization key, i=1, ..., Nw;

δ: Quantization parameter.

(2) Watermark Hiding:

First, perform a wavelet transform of order L on the original image (f(m, n)). 3 L different wavelet coefficients of the image, and the wavelet coefficient (fa, L(m, n)) of the maximum order and the minimum frequency can be obtained through the wavelet transform of order L. The said wavelet coefficients can be expressed as follows:

$$\{f_{k,l}(m,n)\} := DWT_{Haar}[f(m,n)]$$

wherein k=h, v, d, a; l=1, ..., L.

Next, for the said wavelet coefficients, utilize ckey(i) to select coefficient positions of embedded watermarks. The steps are described as follows.

Step 1: If ckey(i)=$f_{k,l}(m,n)$ wherein 'i' lies between 1 and Nw, execute the following adjustment:

$$\text{if } Q_\delta(f_{k,l}(m, n)) \neq w(i) \oplus qkey(i)$$

$$z_{k,l}(m, n) = \begin{cases} f_{k,l}(m, n) - \delta 2^l, & \text{if } f_{k,l}(m, n) > 0 \\ f_{k,l}(m, n) + \delta 2^l, & \text{if } f_{k,l}(m, n) \leq 0 \end{cases}$$

else $$z_{k,l}(m, n) = f_{k,l}(m, n)$$

end wherein $Q_\delta(f)$ is defined as follows:

$$Q_\delta(f) = \begin{cases} 0, & \text{if } \left\lfloor \frac{f}{\delta 2^l} \right\rfloor \text{ is even} \\ 1, & \text{if } \left\lfloor \frac{f}{\delta 2^l} \right\rfloor \text{ is odd} \end{cases}$$

Step 2: Do not perform a quantified adjustment on every wavelet coefficient of the maximum order (L) and minimum frequency (k=a) at (m, n).

Step 3: Execute discrete wavelet reverse transform of order L to acquire the original image Z(m, n) based on the wavelet coefficient set $\{Z_{k,l}(m, n)\}$. Z(m, n) is defined as follows:

$$Z(m,n) = IDWT_{HAAR}[\{Z_{k,l}(m,n)\}]$$

wherein k=h, v, d, a, and l=1, 2, ..., L.

(3) Method for Extracting Watermarks and Method of Tampering Assessment:

For an image Z(m, n) that a watermark has been embedded in, original watermarking information w(i) (I=1, 2, ..., Nw) encrypted by a secret key 'K' is necessary, wherein the secret key 'K' can also be utilized to decrypt the original watermarking information. The first step is to perform a Haar discrete wavelet transform of order L on the original image Z(m, n) to generate 3 L wavelet coefficients $Z_{k,l}(m, n)$, wherein k=h, v, d; l=1, ... L (l represents wavelet coefficients decomposed from different wavelet analytic sheaves).

Watermarking bits are extracted from the decomposed wavelet coefficients $\{Z_{k,l}(m, n)\} := DWT_{Haar}[Z(m, n)]$. Each extracted watermarking bit is $\tilde{w}(i) = Q_\delta(Z_{k,l}(m,n)) \oplus qkey(i)$ (i=1, 2, ... Nw). The wavelet coefficients $Z_{k,l}(m,n)$ are selected via ckey(i). Next, $\tilde{w}(i)$ is decrypted to restore the original watermark via the secret key 'K'. Next, determine whether the restored watermark is the same as the owner's watermark. Finally, the following formula is utilized to execute a tampering assessment:

$$\text{if } TAF(w, \tilde{w}) > T,$$

tampering affects image authentication;

else, the content of the image is trustworthy;

end, wherein $$TAF(w, \tilde{w}) = \frac{1}{N_w} \sum_{i=1}^{N_w} w(i) \oplus \tilde{w}(i),$$

and T represents a tolerance limit for image tampering.

The said method not only determines whether an image is tampered with, but also acquires the tampering position via the embedded watermarking positions. Furthermore, the tolerance limit for JPEG compression can also be adjusted by a quantified intensity 'δ' according to the said method. However, the accuracy of the said method decreases when the image is attacked by non-malicious attacks. And the said method cannot restore the tampered blocks.

Another two methods for detecting and marking tampered blocks were disclosed in 2004. The two methods involve estimating brightness variations of an image in a space domain and AC (Alternating Current) coefficient variations of an image in a DCT domain, respectively, for hiding watermarking information.

Related studies on human vision show that the vision system of humans is not sensitive to variations of a pixel, even up to a few specific tampered pixels. Therefore, correlations of coefficients of image blocks are utilized as references for embedding watermarking information. An optimal balance between invisibility, information volume, and robustness can be achieved when embedding watermarking information according to the said method, and the said method can be also applied to video compression technology based on DCT, such as MPEG-1, MPEG-2, H.261, H.263, . . . , and so on.

More detailed description for estimating brightness variations of an image in the space domain is provided as follows.

(1) Parameter Definition:

$L_{real}$: brightness information of central pixel;

$L_{mean}$: mean value of brightness information of adjacent pixels in a selected block;

$\Delta 1$, $\Delta 2$: thresholds for embedding and authenticating.

(2) Watermark Hiding:

Please refer to FIG. 1, FIG. 2, FIG. 3, and FIG. 4. As shown in FIG. 1, FIG. 2, FIG. 3, and FIG. 4, the selected block can be 3×3 (FIG. 1), 5×5 (FIG. 2), 7×7 (FIG. 3), or 9×9 (FIG. 4). $L_{real}$ is the value of the central pixel in a block marked as 'o', and $L_{mean}$ is a mean value of adjacent pixels in the selected block.

If the embedded feature bit is 1, the brightness information of the central pixel is adjusted to satisfy the following formula.

$$L_{real} \geq L_{mean} + \Delta 1$$

If the embedded feature bit is 0, the brightness information of the central pixel is adjusted to satisfy the following formula.

$$L_{real} < L_{mean} - \Delta 2$$

Experimental results show that an optimal range occurs when $\Delta 1$ and $\Delta 2$ are set to 5-10% of $L_{real}$.

(3) Method for extracting watermarks and method of performing tampering assessment:

The method for extracting the embedded watermarking information is similar to the embedding method.

First, calculate $L_{real}$ and $L_{mean}$. If $L_{real} \geq L_{mean}$, the extracted bit is 1. If $L_{real} < L_{mean}$, the extracted bit is 0. Next, compare the extracted bit with the original feature bit to detect tampered blocks.

Detailed description for estimating AC coefficient variations of an image in the DCT domain is provided as follows.

(1) Parameter Definition:

$AC_i$: AC coefficient in a low frequency zone of a central block;

$AC_i'$: AC coefficient in a low frequency zone of an estimated central block;

$\Delta$: threshold for embedding and authenticating.

(2) Watermark Hiding:

The related method was disclosed in 1999. DC (Direct Current) coefficients in 9 8×8 DCT blocks are utilized to calculate the embedded information so as to adjust the DC coefficients in the central block as watermarking information. However, the method only utilizes 4 blocks (up, down, left, right) of the 9 DCT blocks to estimate the DC coefficients (as shown in FIG. 5). The method has a higher sensitivity to human vision. That is to say, adjusting DC coefficients decreases PSNR (Peak Signal-to-Noise Ratio) of image quality. Furthermore, for estimation of $\Delta$, it is difficult to control robustness and invisibility of the watermarking information to achieve an optimal balance.

An improved method was disclosed in 2004. This method utilizes 8 adjacent blocks to increase the estimation accuracy of AC coefficients, and embeds watermarking information into 5 AC coefficients in the low frequency zone. This method can reduce loss of image quality caused by increase of embedded information. The related formulas are expressed as follows.

$$AC(0,1) = 1.13884 \times (DC_4 - DC_6)/8;$$

$$AC(1,0) = 1.13884 \times (DC_2 - DC_8)/8;$$

$$AC(0,2) = 0.27881 \times (DC_4 + DC_6 - 2DC_5)/8;$$

$$AC(2,0) = 0.27881 \times (DC_2 + DC_8 - 2DC_5)/8;$$

$$AC(1,1) = 0.16213 \times (DC_1 + DC_9 - DC_3 - DC_7)/8;$$

Next, feature bits are embedded into 5 AC coefficients of the central block according to the following formula, wherein $AC_i'$ represents 5 AC coefficients (AC(0,1), AC(1,0), AC(0,2), AC(2,0), AC(1,1)) estimated by the aforementioned formulas.

Set $AC_i \geq AC_i' + \Delta$ to embed bit '1';

Set $AC_i \leq AC_i' - \Delta$ to embed bit '0';

(3) Method for extracting watermarks and method of performing tampering assessment:

First, compare $AC_i$ with $AC_i'$. If $AC_i > AC_i'$, the extracted bit is '1'. If $AC_i < AC_i'$, the extracted bit is '0'.

Next, compare the extracted bits with the original feature bits to determine whether the central block has been tampered with.

This method has the following drawbacks. First, when $AC_i = AC_i'$, the extracted bit cannot be determined as 0 or 1. Second, watermark information embedding is only performed on the central block of the 9 8×8 DCT blocks. This results in a blocking effect during image authentication. Therefore, tampered blocks cannot be marked exactly.

Another two image authentication methods respectively targeting JPEG compression and MPEG compression were disclosed between 1999 and 2001. More descriptions for two related theories of the said methods are provided as follows.

1. '$F_p$' and '$F_q$' are defined as two non-overlapping 8×8 DCT blocks in an image. 'Q' is a quantization table for JPEG lossy compression, $\forall u, v \in [0, \ldots 7]$, $\forall p, q \in [, \ldots \beta]$, '$\beta$' is the number of all 8×8 DCT blocks in the image, $$\Delta F_{p,q} \equiv F_p - F_q, \tilde{F}_p(u,v) \equiv \text{integer round}\left(\frac{F_p(u,v)}{Q(u,v)}\right) \cdot Q(u,v),$$

and it is supposed that $\Delta \tilde{F}_{p,q} \equiv \tilde{F}_p - \tilde{F}_q$.

The formula is expressed as follows:

if $\Delta F_{p,q}(u,v) > 0$, then $\Delta \tilde{F}_{p,q}(u,v) \geq 0$.

else if $\Delta F_{p,q}(u,v) < 0$, then $\Delta \tilde{F}_{p,q}(u,v) \geq 0$, else $\Delta F_{p,q}(u,v) = 0$, then $\Delta \tilde{F}_{p,q}(u,v) = 0$ 2. 'k' is a constant threshold (k ∈ R), and $$k_{u,v} \equiv \text{integer round}\left(\frac{k}{Q(u,v)}\right)$$

('u' and 'v' are arbitrary numbers). The related formula is expressed as follows:

if $\Delta F_{p,q}(u, v) > k$, $\Delta \tilde{F}_{p,q}(u, v) \geq \begin{cases} k_{u,v} \cdot Q(u, v), & \frac{k}{Q(u, v)} \in Z \\ (\tilde{k}_{u,v} - 1) \cdot Q(u, v), & \text{elsewhere} \end{cases}$ else if $\Delta F_{p,q}(u, v) < k$, $\Delta \tilde{F}_{p,q}(u, v) \leq \begin{cases} k_{u,v} \cdot Q(u, v), & \frac{k}{Q(u, v)} \in Z \\ (\tilde{k}_{u,v} - 1) \cdot Q(u, v), & \text{elsewhere} \end{cases}$ else $\Delta F_{p,q}(u, v) = k$, $\Delta \tilde{F}_{p,q}(u, v) \leq \begin{cases} k_{u,v} \cdot Q(u, v), & \frac{k}{Q(u, v)} \in Z \\ (\tilde{k}_{u,v} \text{ or } \tilde{k}_{u,v} + 1) \cdot Q(u, v), & \text{elsewhere} \end{cases}$ According to the said theories, the said authentication method for JPEG compression can remove uncertainty of watermarking information caused by JPEG compression. More detailed description for the said authentication method targeting JPEG compression is provided as follows.

(1) Parameter Definition:

f(m, n): Original image;

$L \in Z^+$: Maximum order of wavelet transform;

$f_{k,l}(m, n)$: Wavelet coefficient, k=h, v, d, a; l=1, 2, 3, . . . , L;

(2) Watermark Hiding:

First, extract N kinds of different feature vector sets from the original image, divide the original image into 8×8 blocks, and perform DCT on each block. Next, divide all blocks 'β' into two groups. One group is p=$p_1$ to $p_{\beta/2}$. Then, utilize different thresholds 'k' and '$b_n$' for the N kinds of different feature vector sets, wherein 'k' is thresholds applied in Theorem 2.

If n=1, k=0 so that positive and negative symbols of $\Delta F_{p,q}$ can be retained. Subsequently, 'k' can be set as a dynamic dualistic-determining range to ensure image authentication is correct. The more feature vector sets are extracted, the more correct the image authentication is.

Next, W: $\Re \rightarrow \Re$ is defined as a map function. Subsequently, two sets, $p_p=\{p_1, p_2, \ldots, p_{\beta/2}\}$ and $p_q=\{q_1, q_2, \ldots, q_{\beta/2}\}$, can be found to make '$P_q$' equal to $W(P_p)$, and satisfy the following conditions: $p_p \cap p_q=\phi$ and $p_p \cup p_q=P$ (for example, $p_p=\{1, 3, 5, \ldots, \beta-1\}$, $p_q=\{2, 4, \ldots, \beta\}$).

Finally, calculate $\Delta F_{p,q}$ of the $b_n$ coefficient of every block in the 'P' group. If $\Delta F_{p,q}(v)<k$, the extracted feature code '$Z_n$' is '0'. Otherwise, '$Z_n$' is '1'.

All extracted feature code sets are set as feature information of the original image. The feature information can be utilized for image authentication.

(3) Method of Image Authentication:

Based on the said feature information extracting method, tampered blocks can be determined by comparing the extracted feature code '$\tilde{Z}_n$' with the stored feature code '$Z_n$'.

Similarly, many image restoration methods have also been disclosed in recent years. A method of image restoration was disclosed in 2001. The method involves acquiring image feature information from a DCT domain, and then utilizing the image feature information to perform image authentication or restoration. Please refer to FIG. 6. First, an original image is divided into non-overlapping 8×8 blocks, and DCT is performed on each block. It can be seen that energy in the DCT domain will gather obviously at the upper left corner in a zigzag pattern (as shown in FIG. 7, FIG. 8, FIG. 9, and FIG. 10).

Next, every DCT block is quantified via a JPEG standard quantization table. In most cases, coefficients within the quantified information lie in a low frequency zone of the DCT domain.

This method has two feature coding methods: 64-bit and 128-bit. The feature vectors generated by 128-bit feature coding are larger, but can be utilized to acquire better image quality after restoration.

Please refer to FIG. 11. The numerals in the encoding matrix represent bits, wherein all the numerals greater than 127 are set as 127. For example, 7 in the first column and the first row represents that the maximum encoding range of the corresponding quantified DCT coefficient is 7 bits.

The feature of every block in the image is recorded according to the said principle. After the feature of every block is recorded, the corresponding result is hidden in a LSB (Least Significant Bit) of the space domain.

The said method involves recording low frequency coefficients in DCT domain. This makes textures of the image fuzzier.

Another related method of image restoration based on a space domain was disclosed in 2002. The feature of this method is to restore only an edge of an image. Because of this feature, the length of the image feature vector based on this method is extremely short.

The flowchart for generating image feature information is shown in FIG. 12. The said method utilizes 4 different edge-detecting masks and the following formula to acquire the edge of the image:

$$R_k = \left| \sum_{i=1}^{4} \sum_{j=1}^{4} z(i, j) \times \text{Mask}(i, j) \right|, k \in \{H, D^-, D^+, V\}$$

wherein 4 masks (H, D−, D+, and V) represent a horizontal edge mask, a vertical edge mask, a +45° diagonal mask, and a −45° diagonal mask, respectively.

After calculating '$R_k$' of the 4 masks, the maximum value of '$R_k$' is compared with the threshold 'T'. If the maximum value of '$R_k$' is greater than T, the corresponding image feature bit is set as 1 (edge). Otherwise, the corresponding image feature bit is set as 0 (background).

Therefore, only one bit is needed to represent whether a 4×4 block is the edge of the image. That is to say, for an 8×8 block, only 4 bits are needed to represent the edge feature.

Another method of image restoration was disclosed in 2005. This method involves acquiring feature vectors of an image in a space domain, and then performing Hash encoding on the acquired feature vectors to obtain 16-bit authentication information.

The flowchart of the said method is shown in FIG. 13. First, an original image is divided into non-overlapping 8×8 blocks, and then every block is divided into 2×2 sub-blocks. Next, a mean of every sub-block is calculated, and then 6 highest bits are recorded as restoration information of the sub-block.

Therefore, each 8×8 block has 96-bit corresponding restoration information. And, because 2 bits of each pixel are utilized to embed the authentication information into the original image, 128-bit feature information (block position+restoration information+authentication information) is restored in every 8×8 block. Finally, when embedding the feature information, a secret key is utilized to disorder the position of every 8×8 block for preventing feature information of a block from being embedded into itself.

SUMMARY OF THE INVENTION

Some concepts of the present invention have already been published in conference proceedings, as described below:

Tsong-Yi Chen, Da-Jinn Wang, Chung-Yih Lee, and Thou-Ho (Chao-Ho) Chen, "An Effective Authenticating Method on the Compressed Data", 2006 International Conference on Innovative Computing, Information and Control (ICICIC-06), Beijing, P. R. China, August 2006. (pp. 249-252).

The present invention provides a method for performing image authentication and restoration comprising converting a selected image into YCbCr color space; setting YCbCr coefficients (Y $\in$ {16, 17, ..., 235}, Cb, Cr $\in$ {16, 17, ..., 240}); dividing the selected image into a plurality of non-overlapping 8×8 blocks; performing a DCT on each block; calculating DC and AC feature bits of a selected block respectively; generating a coefficient set; determining whether the coefficient set corresponds to a predetermined rule; determining that the selected block is not a tampered image if the coefficient set corresponds to the predetermined rule; executing the following steps if the coefficient set does not correspond to the predetermined rule, the steps comprising: calculating horizontal and vertical flatness indexes of each block; sorting the DCT-converted blocks; acquiring restoration information of the DC and AC coefficients; storing quantified coefficients via DPCM (Differential Pulse Code Modulation); encrypting the restoration information of the DC and AC coefficients; and embedding the encrypted restoration information into the selected block.

The present invention further provides an image authentication processing system for performing the method of image authentication and restoration according to the present invention.

The present invention further provides a digital video recording equipment for performing the method of image authentication and restoration according to the present invention.

The present invention further provides a computer-readable medium for saving function codes so as to make a computer system perform the method of image authentication and restoration according to the present invention.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram of coefficients of the blocks before a DCT is performed according to the prior art.

FIG. 8 is a diagram of coefficients of the blocks after the DCT is performed according to the prior art.

FIG. 9 is a diagram of a JPEG standard quantization table according to the prior art.

FIG. 10 is a diagram of coefficients of the blocks after the coefficients of the blocks in FIG. 8 are quantified via the JPEG standard quantization table in FIG. 9.

FIG. 11 is a diagram of an encoding matrix according to the prior art.

DETAILED DESCRIPTION

Figure 1:
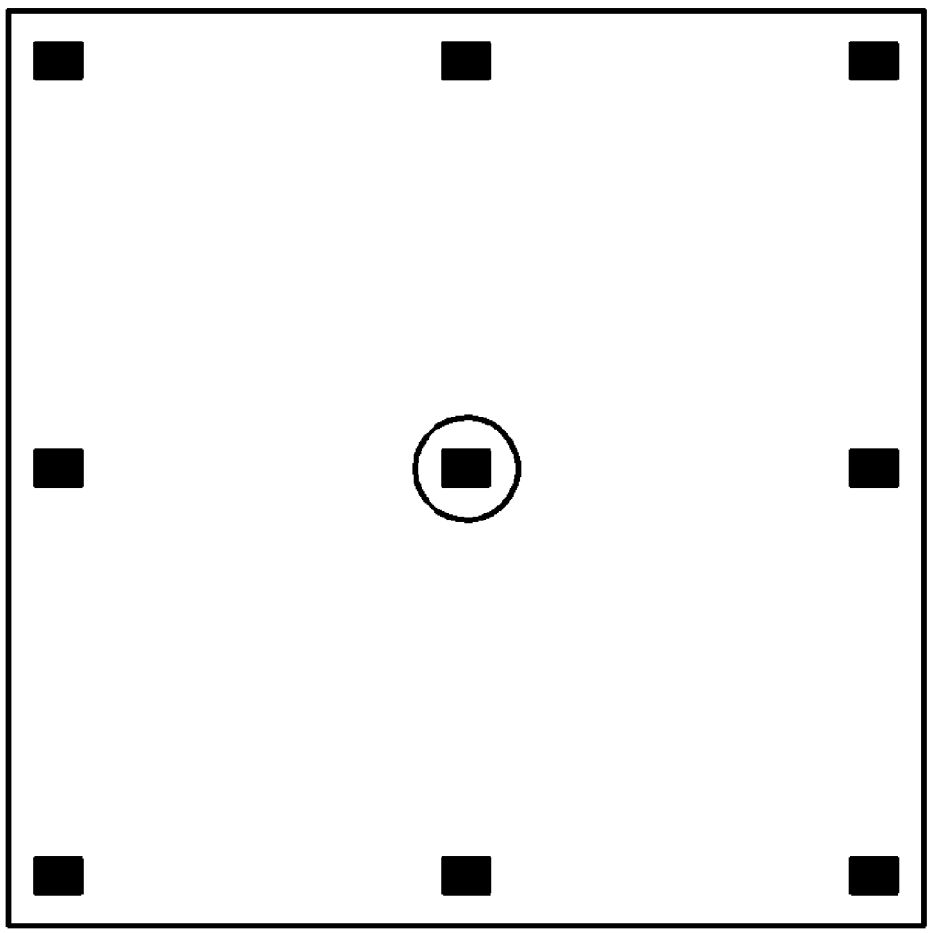
FIG. 1 is a diagram of a central pixel and neighboring pixels in a block according to the prior art.
Figure 2:
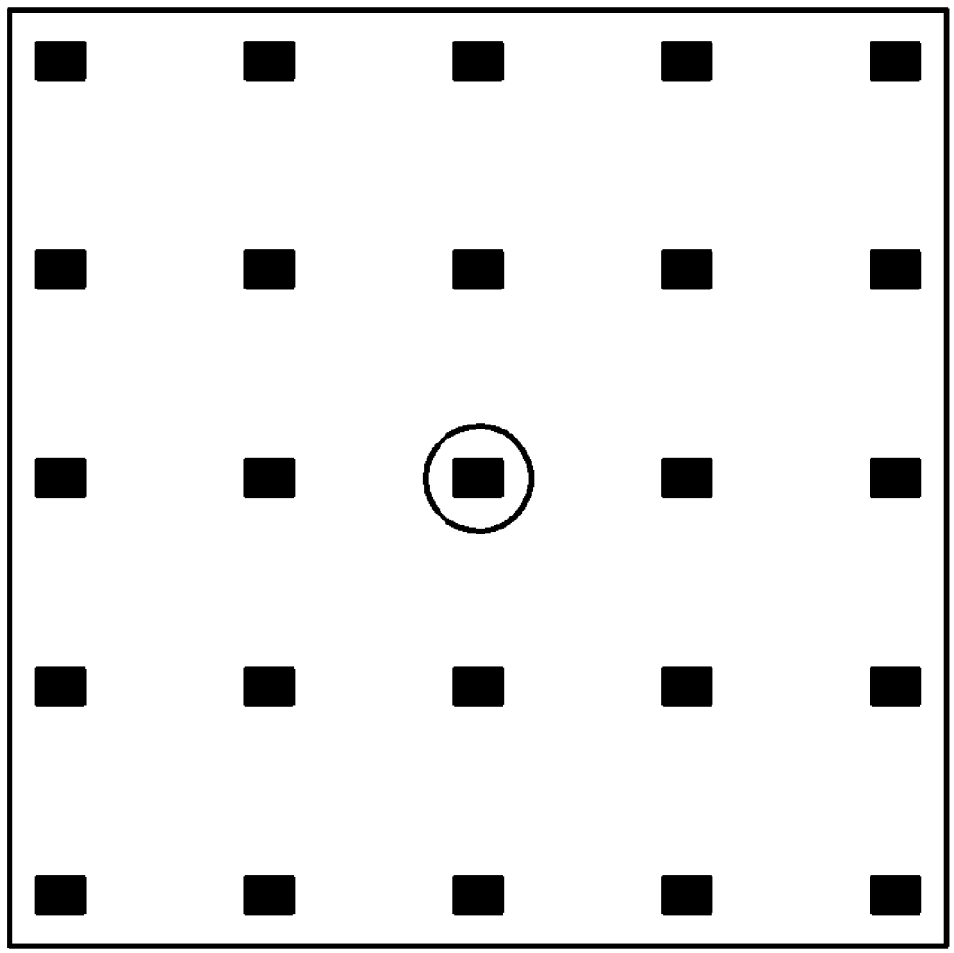
FIG. 2 is a diagram of a central pixel and neighboring pixels in another block according to the prior art.
Figure 3:
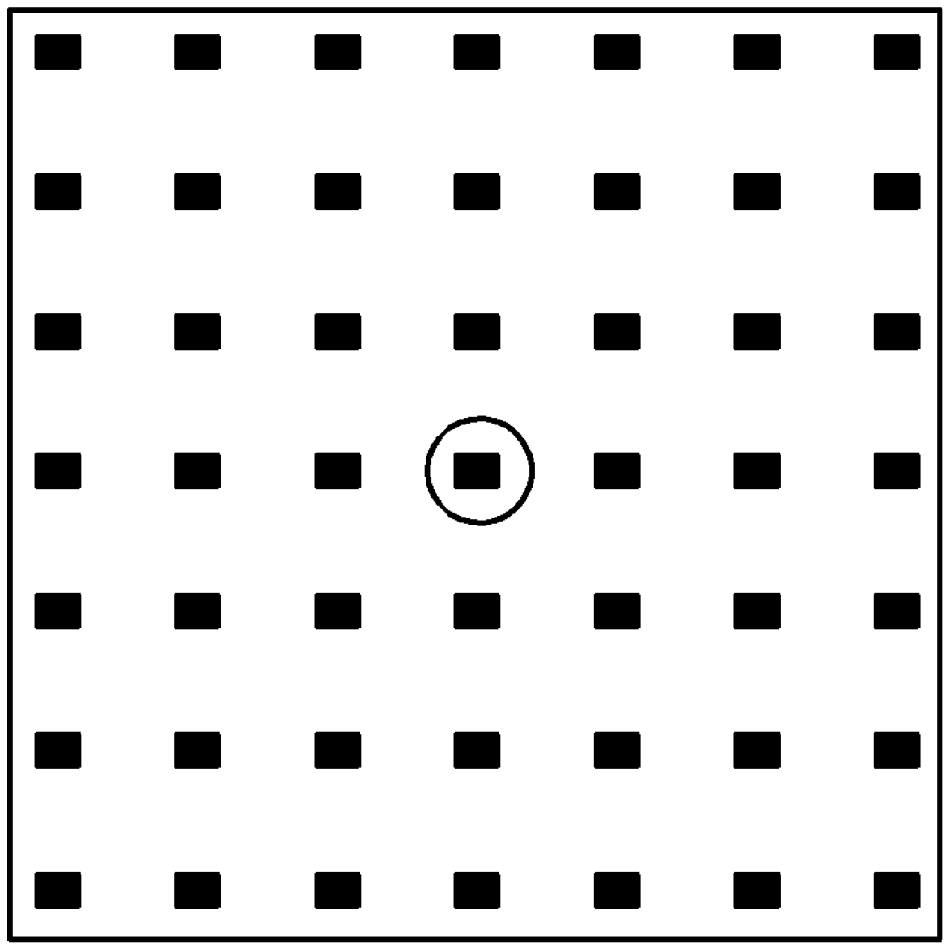
FIG. 3 is a diagram of a central pixel and neighboring pixels in another block according to the prior art.
Figure 4:
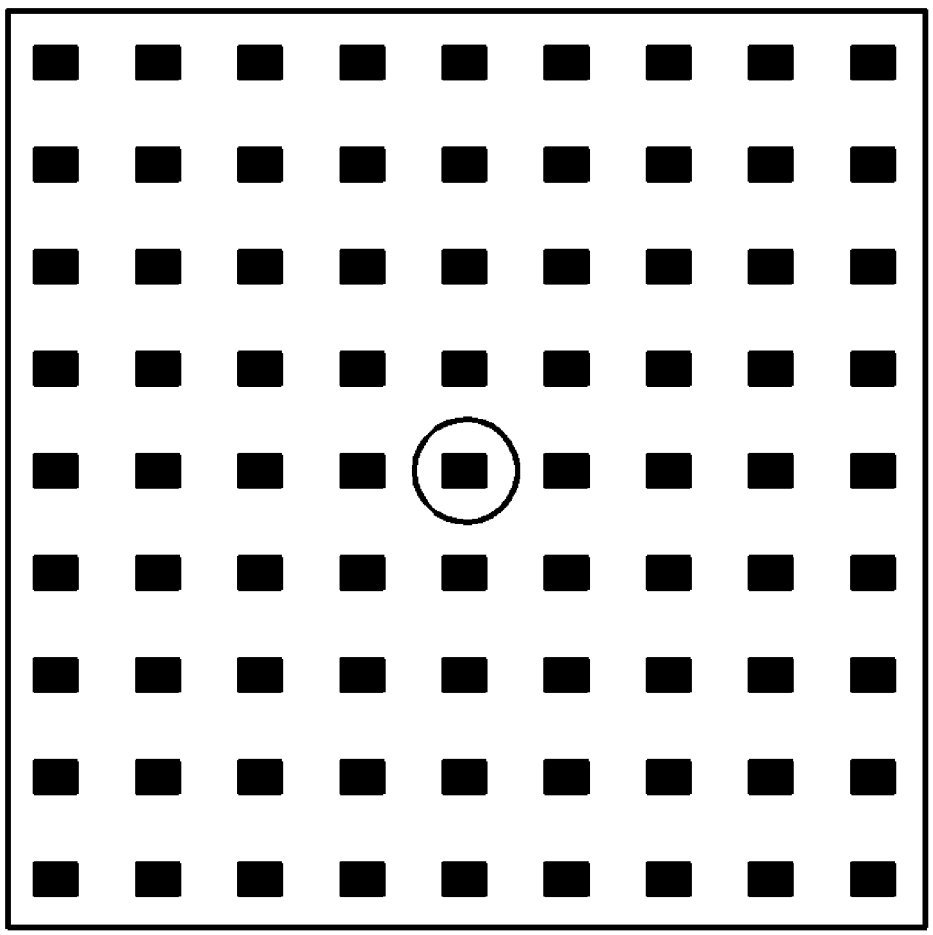
FIG. 4 is a diagram of a central pixel and neighboring pixels in another block according to the prior art.
Figure 5:
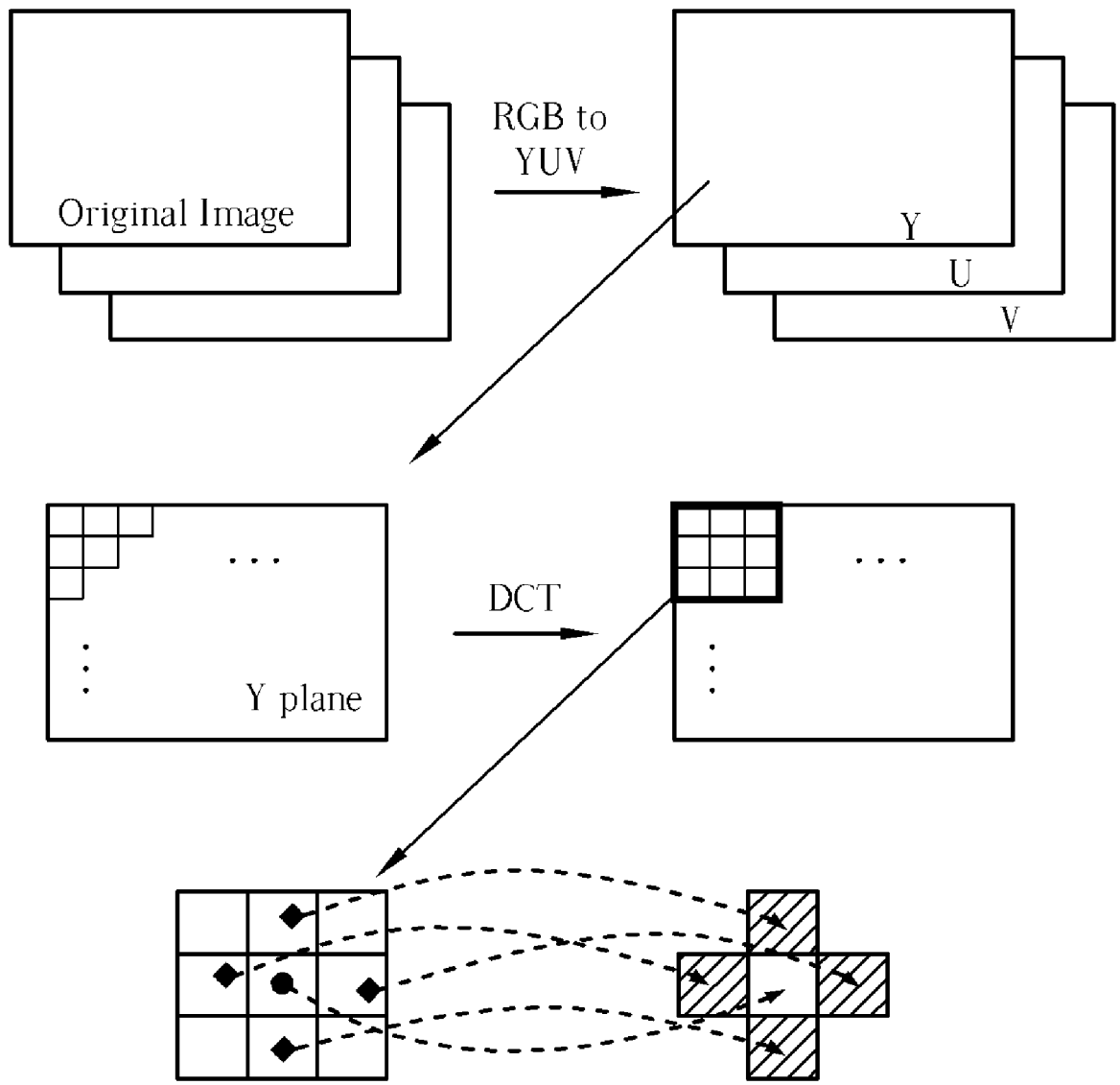
FIG. 5 is a flowchart of utilizing 4 DC coefficients of blocks (upper, lower, left, right) to estimate the DC coefficient of the central block according to the prior art.
Figure 6:
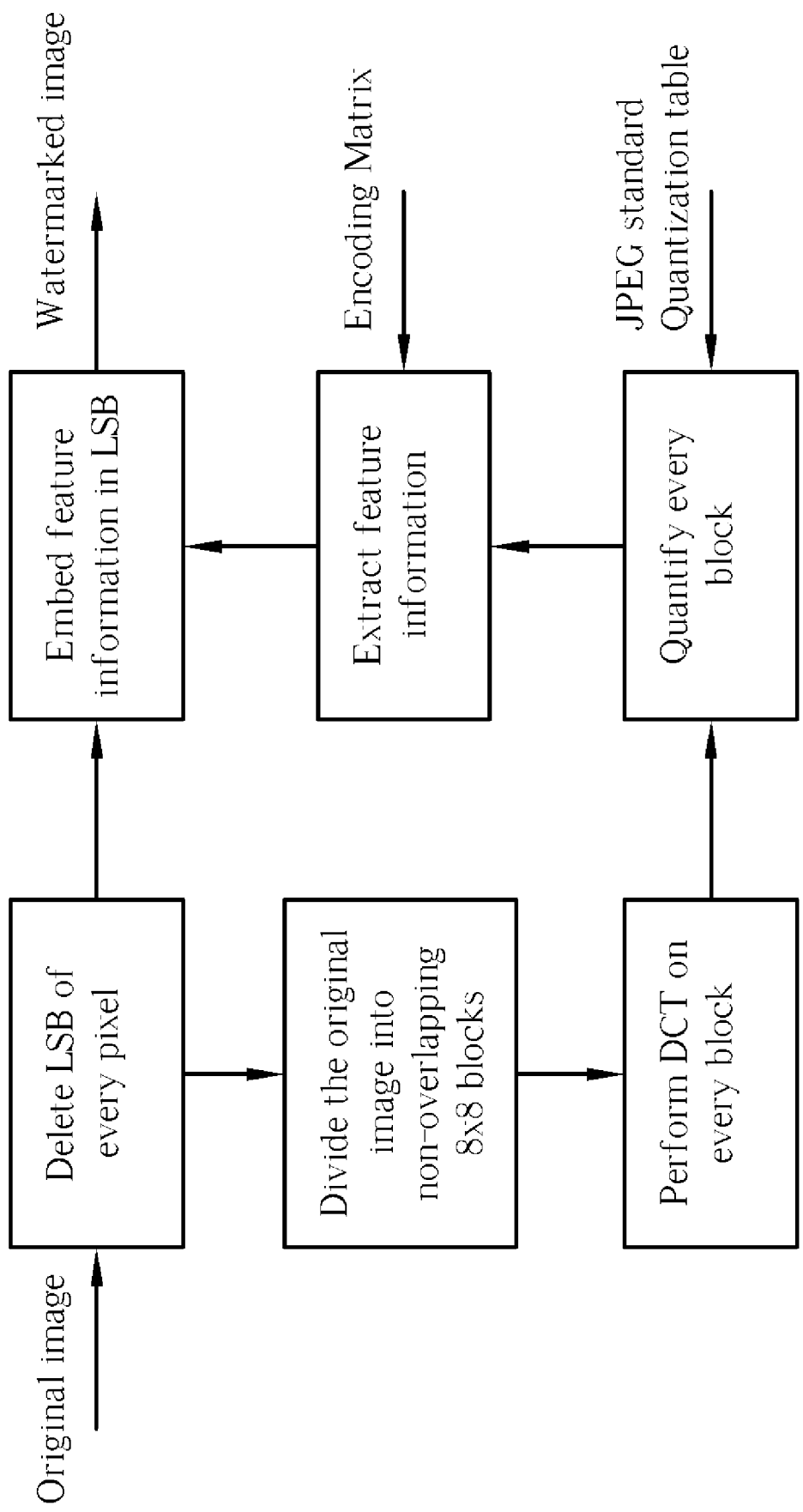
FIG. 6 is a flowchart of an image restoration method according to the prior art.
Figure 12:
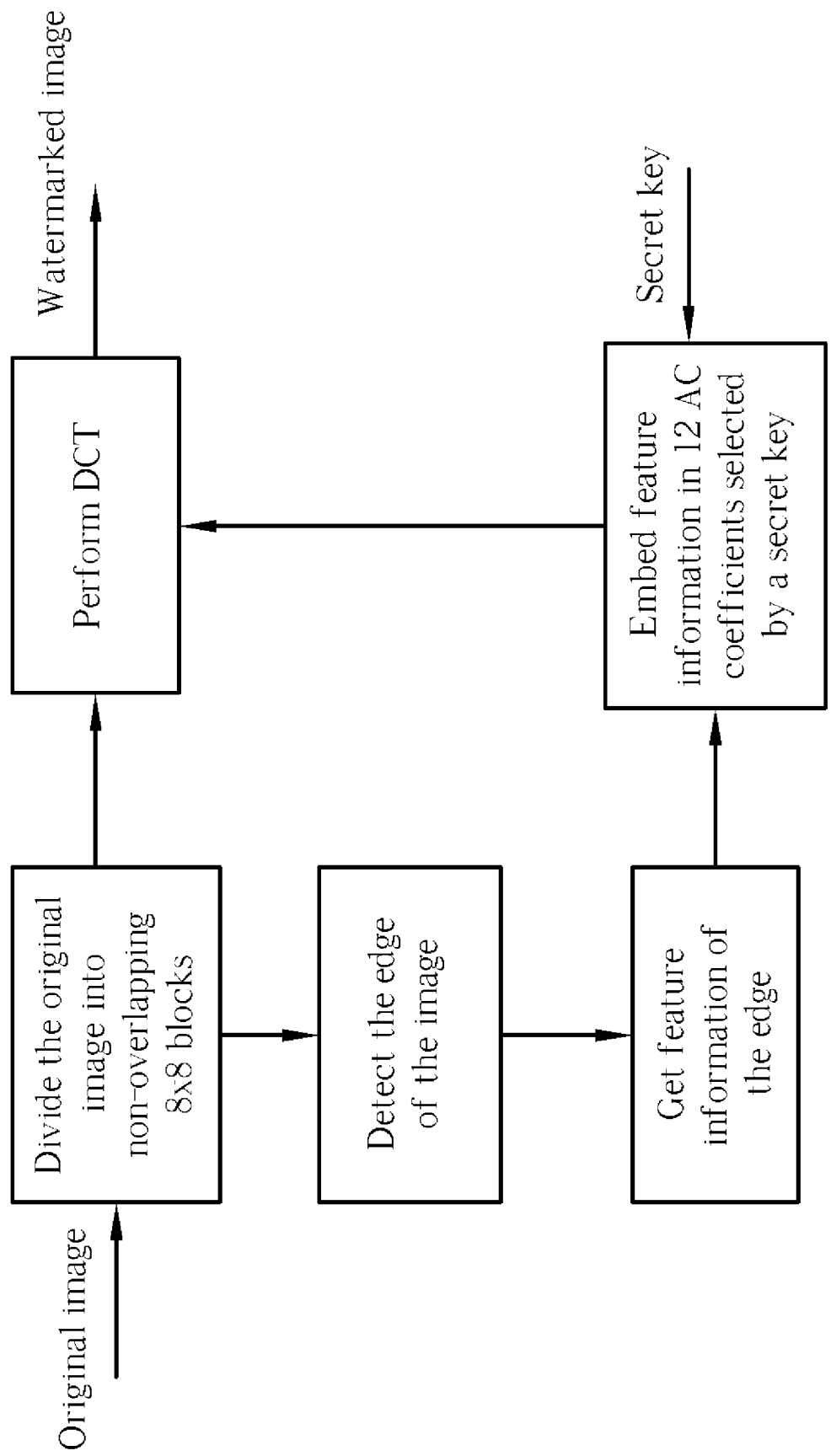
FIG. 12 is a flowchart of extracting feature bits according to the prior art.
Figure 13:
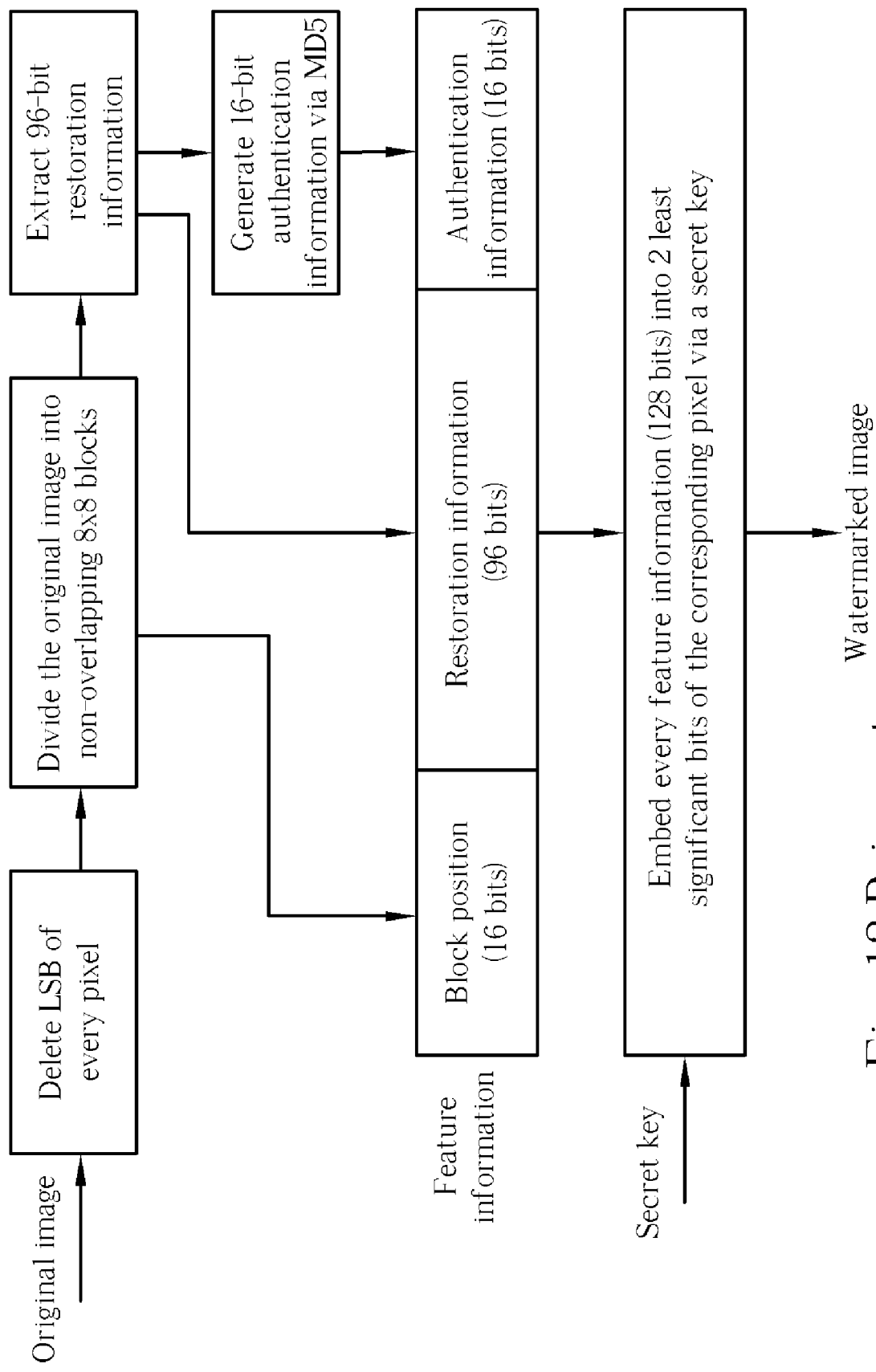
FIG. 13 is a flowchart of another image restoration method according to the prior art.
Figure 14:
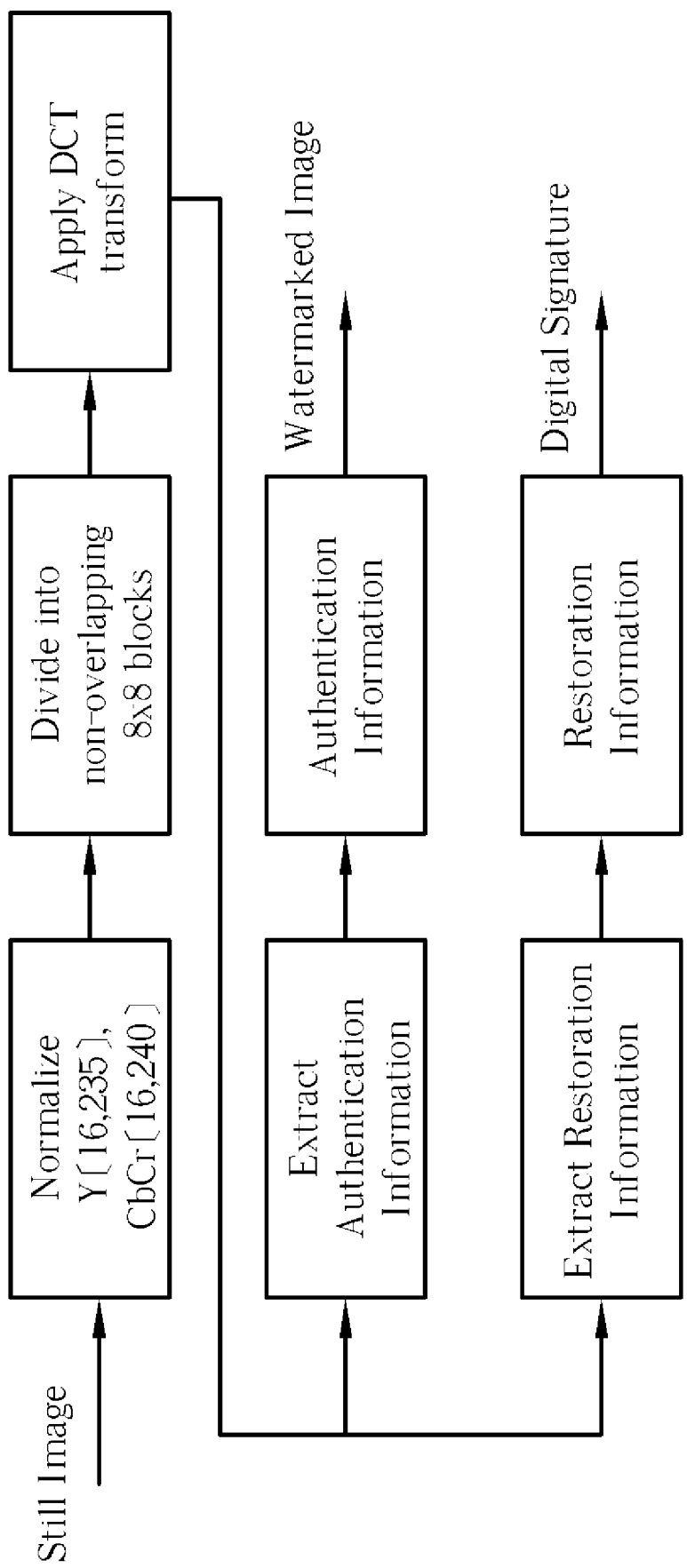
FIG. 14 is a flowchart of a watermark embedding method according to the present invention.
Figure 15:
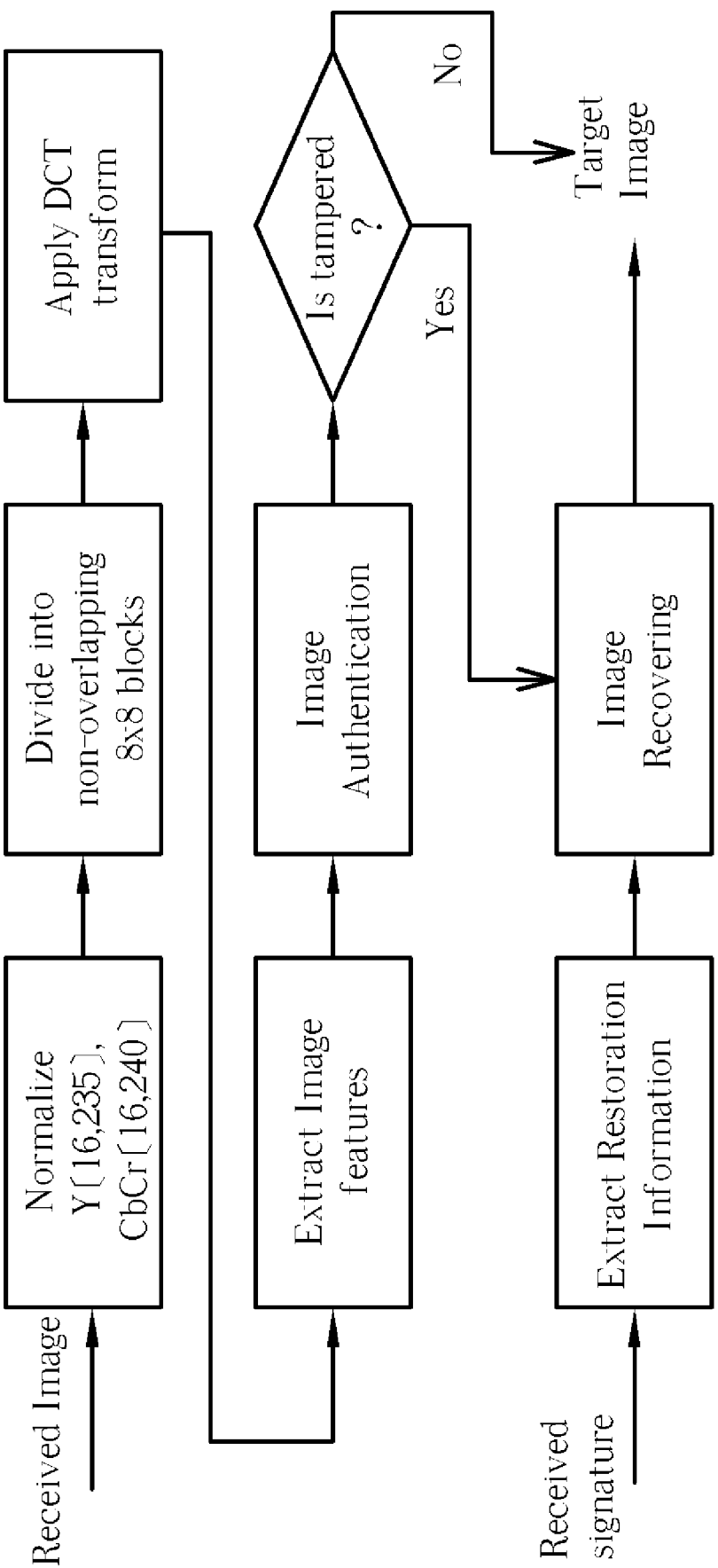
FIG. 15 is a flowchart of an image authentication and restoration method according to the present invention.

For an image, feature information can be extracted adequately via a DCT domain transformation. After a procedure that does not change the content of the image is performed, such as zooming, rotating, and filtering, the original feature information can still be preserved. Therefore, a tolerance limit of a watermarking method based on the DCT domain transformation is higher than for methods based on space domain transformations. Furthermore, the watermarking method based on the DCT domain transformation can also reduce information loss during a compression procedure more effectively. As a result, based on digital watermarking and digital signature techniques, the present invention embeds authentication information into the DCT domain of an original image, and stores the needed restoration information as a digital signature (as shown in FIG. 14 and FIG. 15).

Because total energy remains constant after performing the DCT, the DCT is a lossless transformation method. Therefore, if the image information has been transformed into the DCT domain via the DCT, the transformed image information can still be restored from the DCT domain into the original space domain via an IDCT (Inverse Discrete Cosine Transform).

Although a number of coefficients remains constant before and after performing the IDCT, the transformed pixel-values sometimes exceed an allowable range (0-255). Therefore, YCbCr coefficients should be set as $Y\in\{16, 17, \ldots, 235\}$ $Cb, Cr \in \{16, 17, \ldots, 240\}$ first to reduce errors generated by the IDCT. Next, the image can be divided into non-overlapping 8×8 blocks and the DCT is performed on each block.

Because the DCT is a lossless transformation method, correlations of all 8×8 blocks remain consistent before and after performing the DCT. For example, suppose a DC coefficient $DC_1$ of the first block is greater than a DC coefficient $DC_2$ of the second block. No matter how many times the DCT and the IDCT are performed, the said correlation between the first block and the second block will still remain unchanged.

Figure 16:
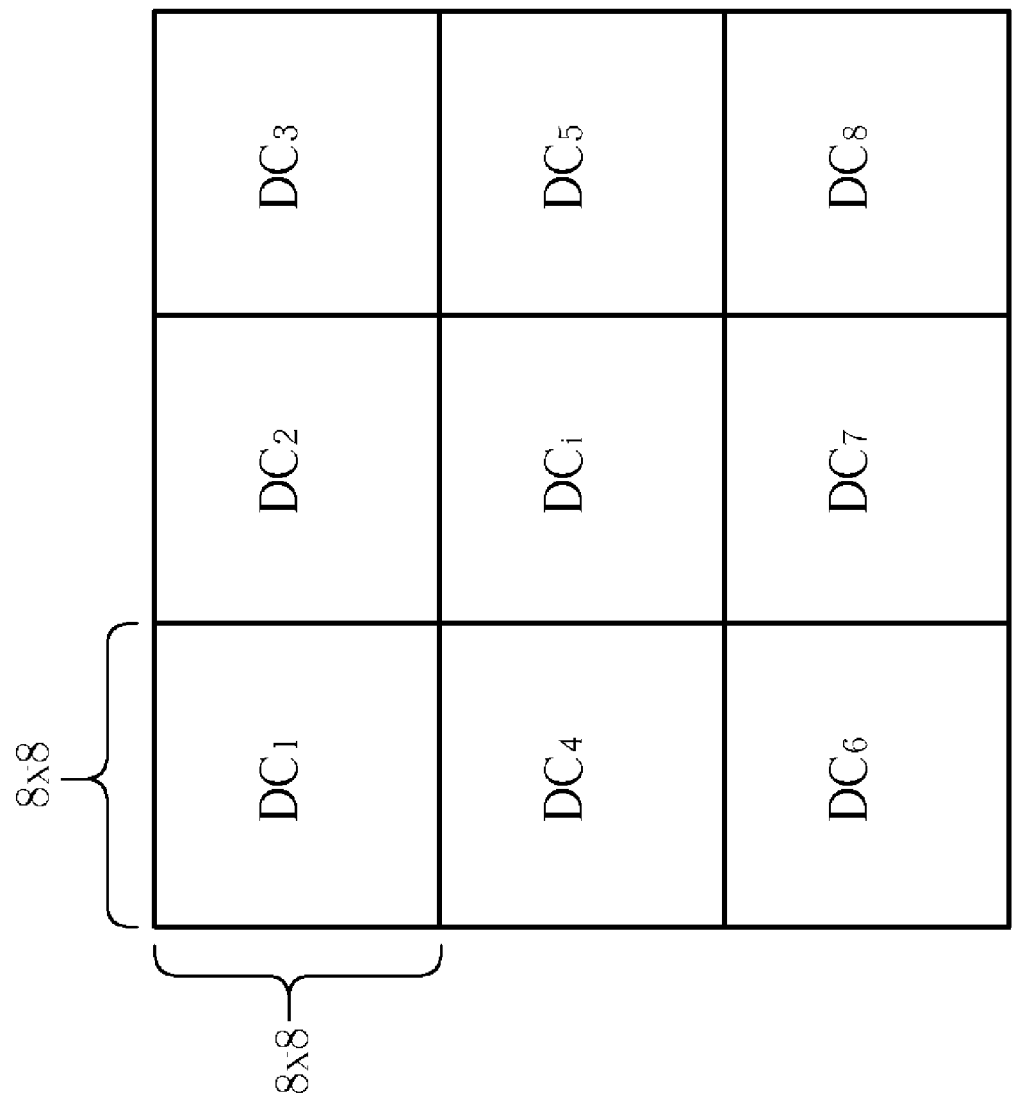
FIG. 16 is a diagram of a selected block according to the present invention.
Figure 17:
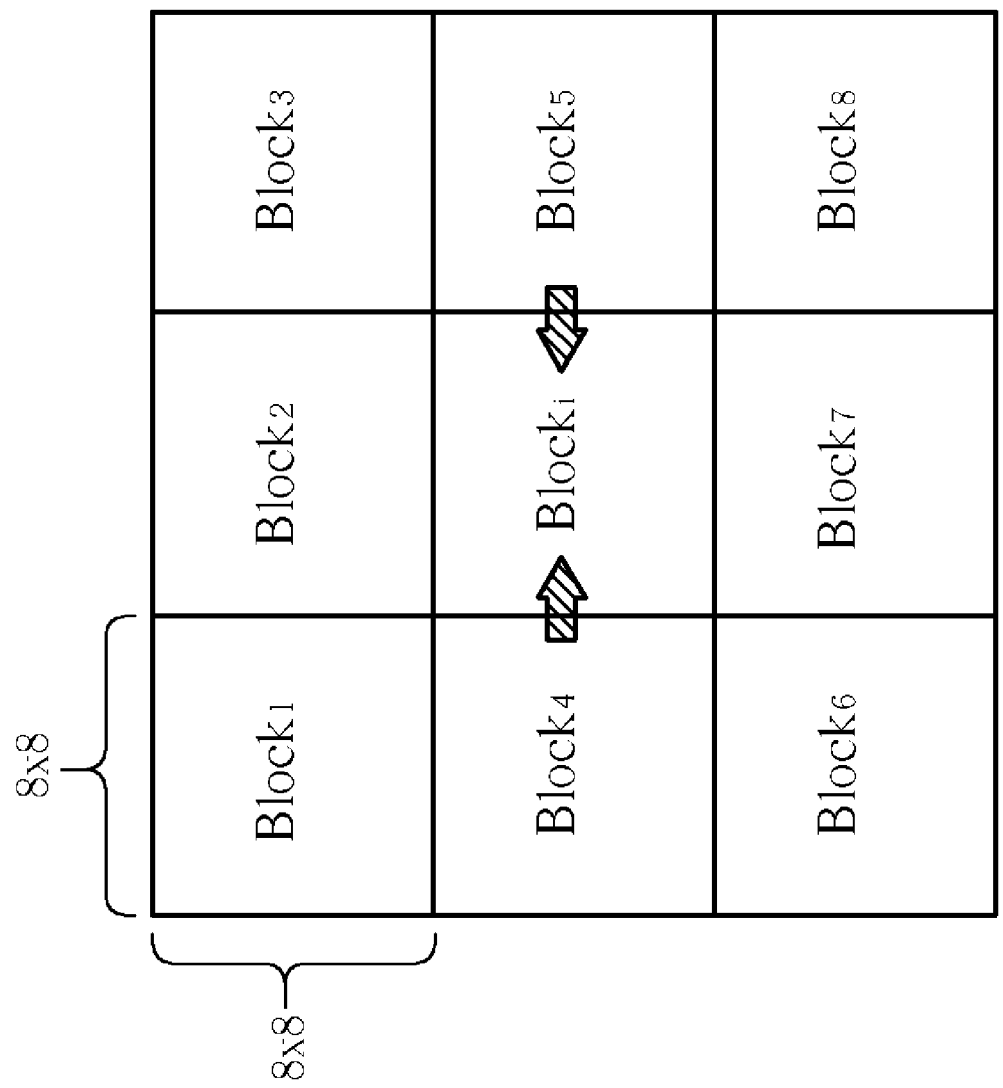
FIG. 17 is a diagram of a method for calculating feature bits (horizontal) according to the present invention.
Figure 18:
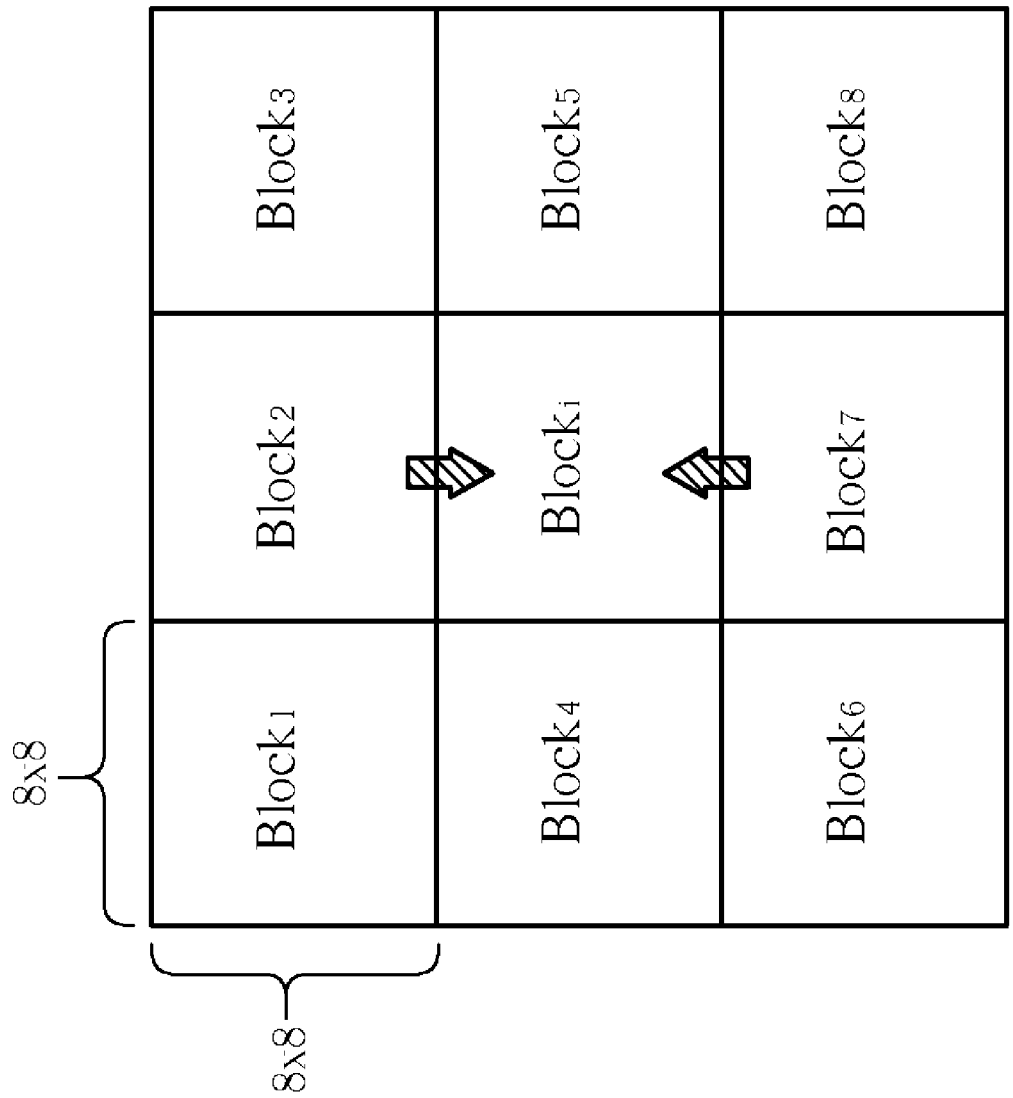
FIG. 18 is a diagram of another method for calculating feature bits (vertical) according to the present invention.
Figure 19:
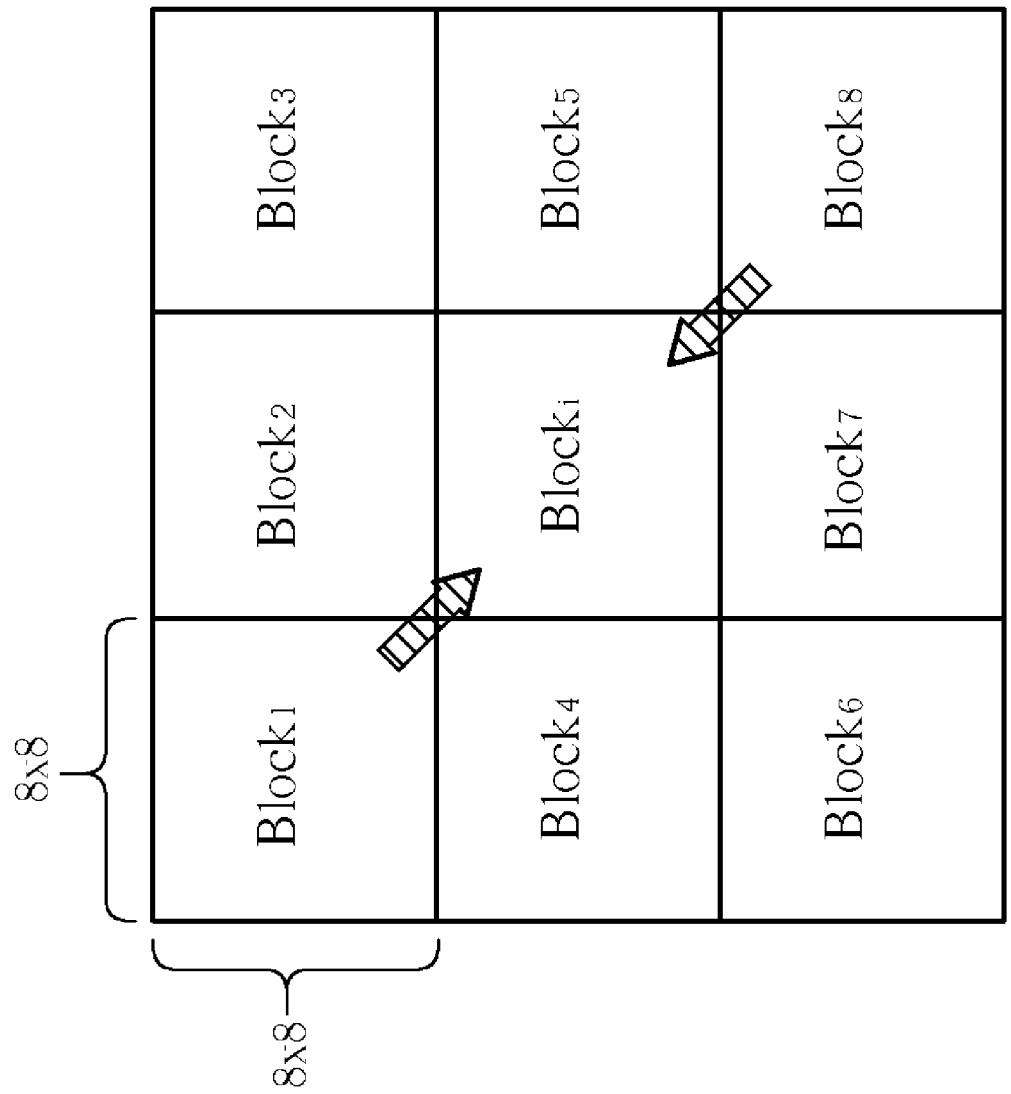
FIG. 19 is a diagram of another method for calculating feature bits (diagonal) according to the present invention.
Figure 20:
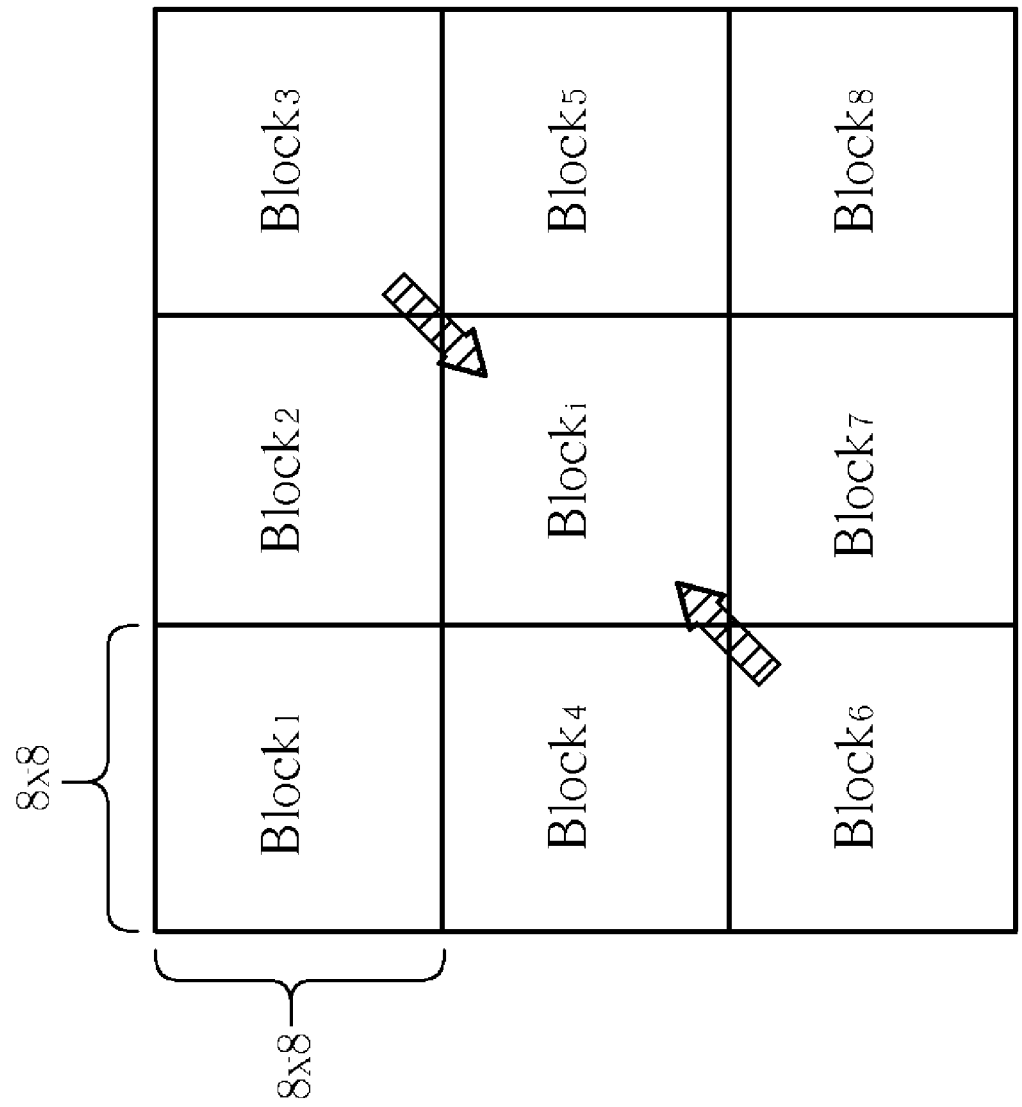
FIG. 20 is a diagram of another method for calculating feature bits (diagonal) according to the present invention.

Next, DC and AC feature bits are calculated respectively (as shown in FIG. 16). For the DC coefficients, m blocks adjacent to an ith block are selected as a basis of comparison while taking the ith block as a center. A distance between each block is set as 'Distb', wherein the value of 'Distb' being equal to 1 represents that the selected range is a 3×3 region, and the greater the value of 'Distb' is, the lower correlations of all 8×8 blocks are. Next, each difference of the DC coefficients '$DC_i$' of the ith block and the DC coefficients '$DC_j$' of the other m blocks ($j \in \{1, 2, \ldots, m\}$) is calculated, wherein if the difference is greater than a set threshold, the DC feature bit of the corresponding block is equal to 1; otherwise, the DC feature bit is equal to 0.

Next, the DC and AC feature bits are extracted respectively. The DC feature bits are extracted based on the following formula:

if $DC_i > \forall DC_j, j \in \{1, 2, \ldots, m\}$ the feature bit ($Feature_i^{DC}$) of $DC_i = 1$ else $Feature_i^{DC} = 0$ If $Feature_i^{DC}=1$ when Distb=1 (please refer to FIG. 16), $Feature_{i+1}^{DC}$ will be equal to 1, identically. In this situation, the speed of extracting the feature bits can be increased.

if $Feature_i^{DC}=1$ then $Feature_{i+1}^{DC}=0$ else $Feature_{i+1}^{DC}=0$ or 1

The said formula is utilized to extract the DC feature bits. For a 512×512 image, $2^{12}$ DC feature bits are extracted based on the said formula and every DC feature bit is equal to either 0 or 1.

Please continue to refer to FIG. 16. For AC coefficients, a 3×3 block shown in FIG. 16 is utilized as a working block. Subsequently, 4 AC feature bits ($Feature_{i,j}^{AC}$) of every block are calculated, wherein 'i' is an index value, and 'j' is an extracted feature-index value ($j \in \{0,1,2,3\}$). Horizontal, vertical, and diagonal calculating methods based on the central block 'l' (please refer to FIG. 17, FIG. 18, FIG. 19, FIG. 20) are utilized respectively to calculate the 4 AC feature bits ($Feature_{i,j}^{AC}$). Every AC feature bit ($Feature_{i,j}^{AC}$) is equal to either 0 or 1.

Figure 21:
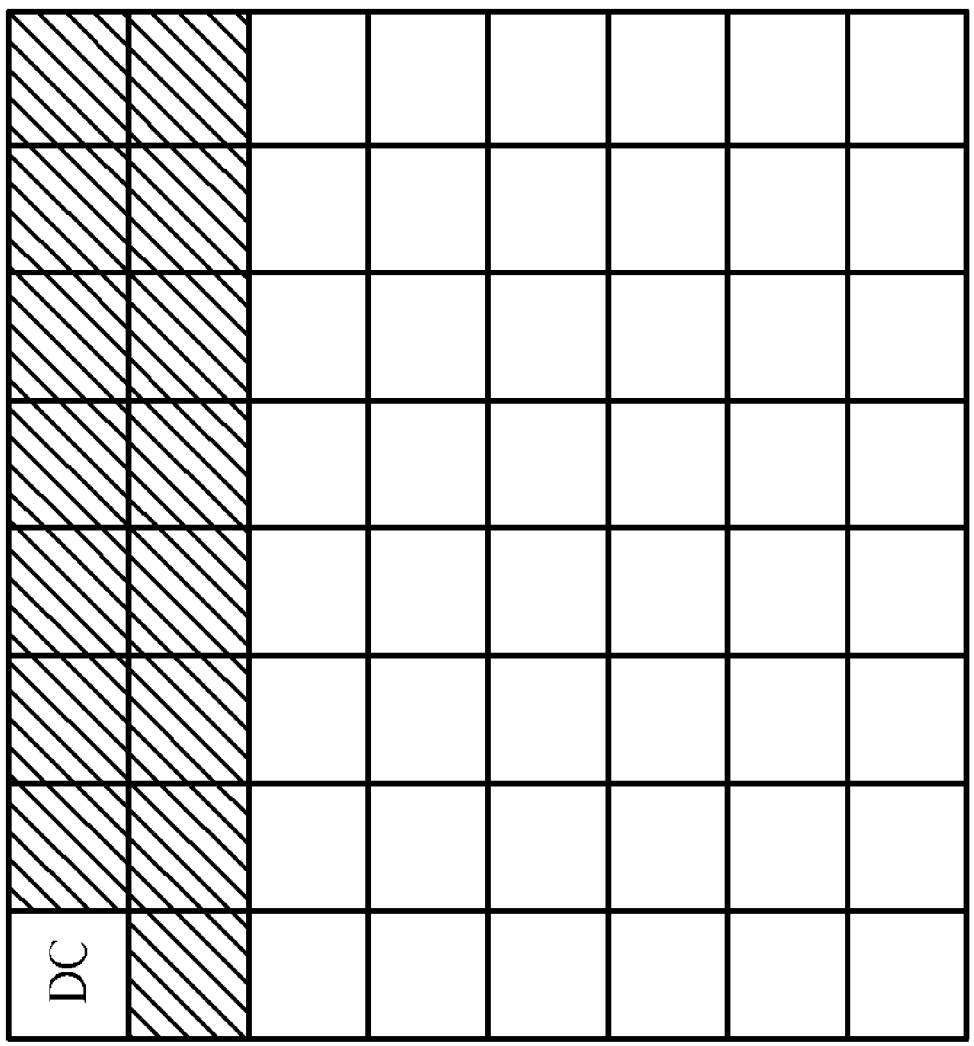
FIG. 21 is a diagram of a method for calculating AC coefficients that are not equal to 0 (horizontal) according to the present invention.
Figure 22:
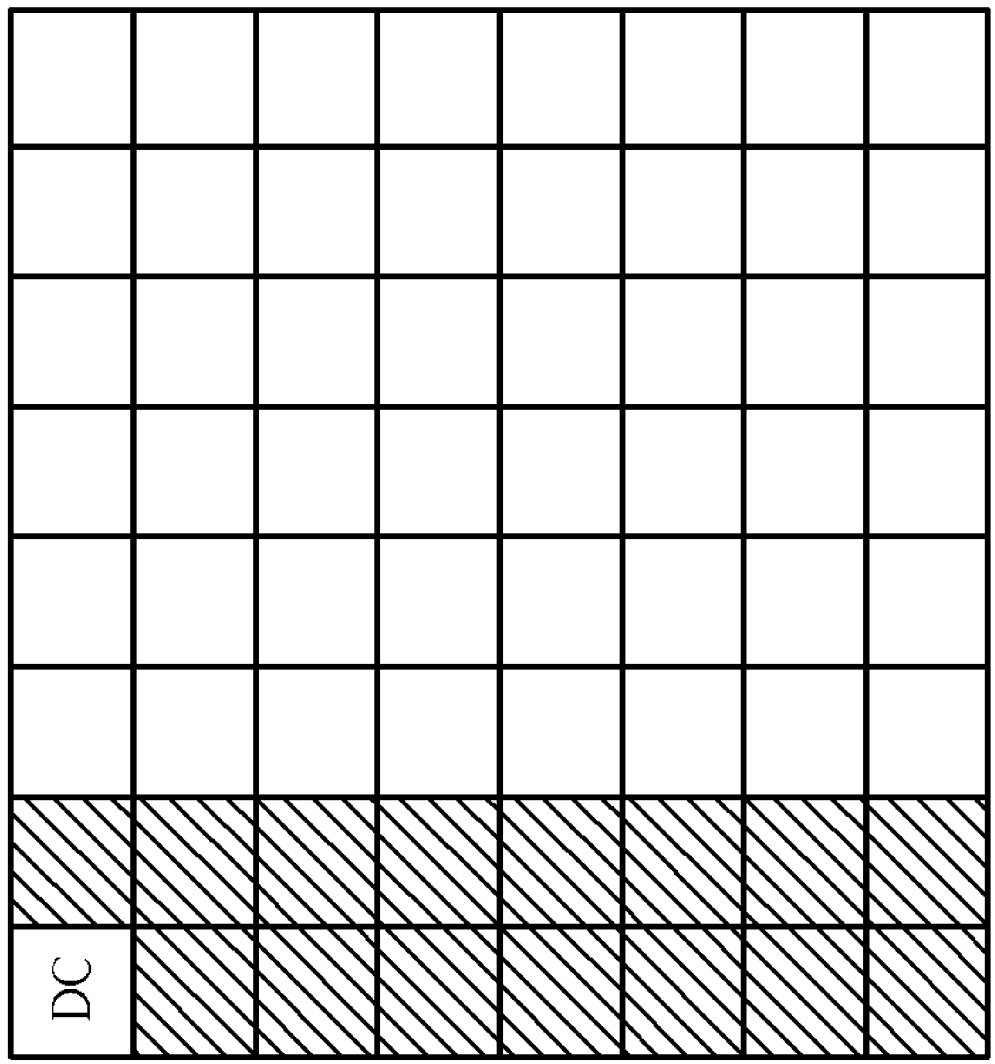
FIG. 22 is a diagram of another method for calculating AC coefficients that are not equal to 0 (vertical) according to the present invention.
Figure 23:
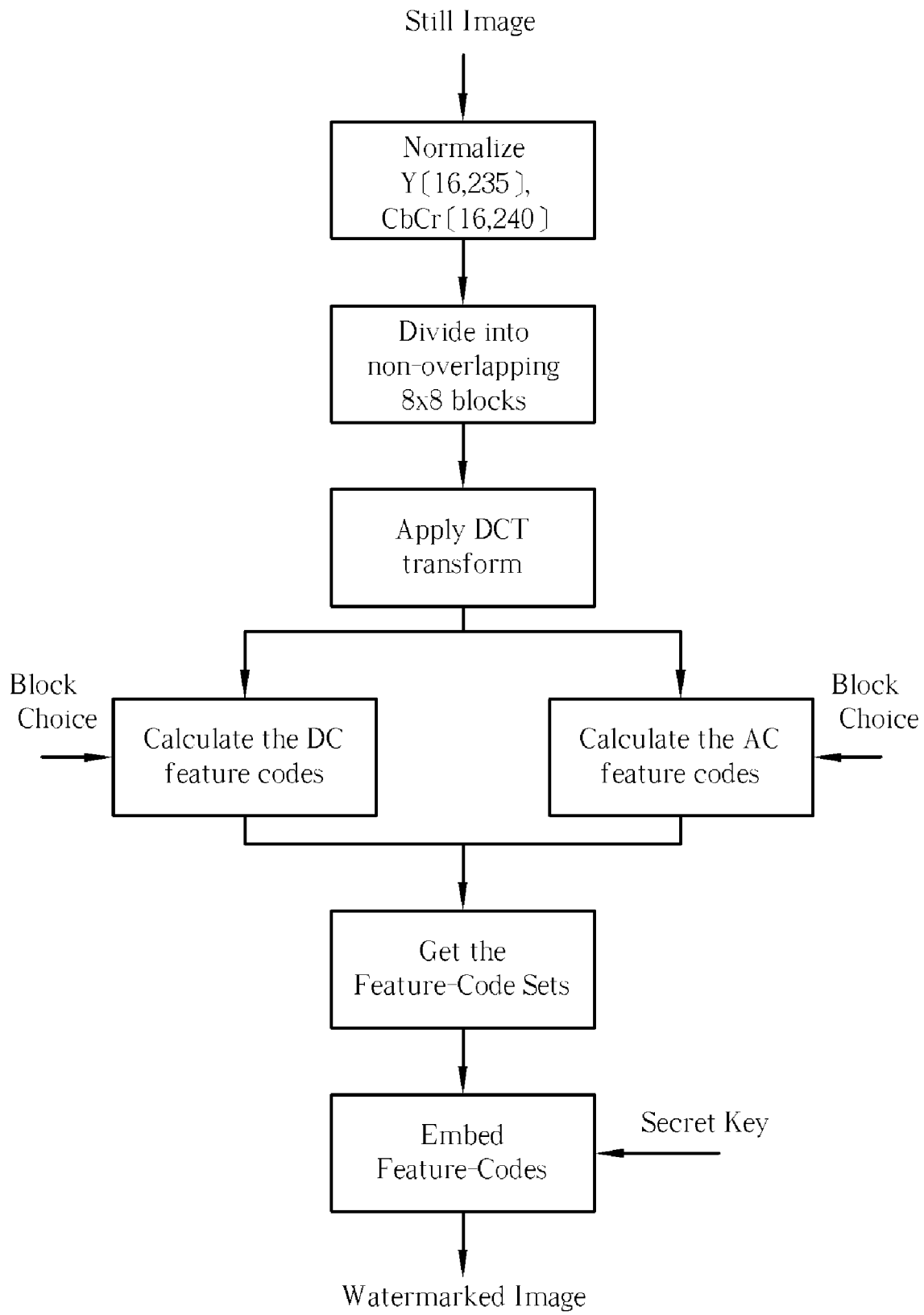
FIG. 23 is a flowchart of an authentication information extraction method according to the present invention.
Figure 24:
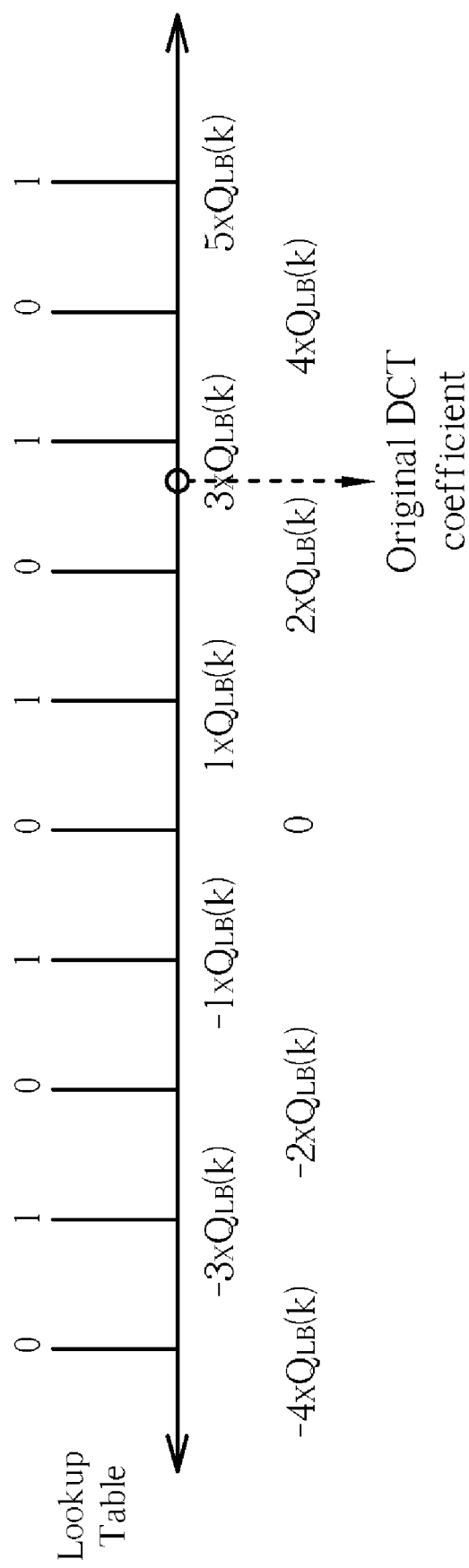
FIG. 24 is a diagram of a lookup table according to the present invention.

The calculating formulas are expressed as follows, wherein $NQAC_{i,k} k \in \{h,v\}$ is a number of AC coefficients that are not equal to 0 in horizontal and vertical directions (please refer to FIG. 21 and FIG. 22). The detailed flowchart is shown in FIG. 23.

if $(NQAC_{i,h} > NQAC_{2,h}) \& (NQAC_{i,h} > NQAC_{7,h})$ $Feature_{i,o}^{AC}=1$ else $Feature_{i,o}^{AC}=0$ if $(NQAC_{i,v} > NQAC_{4,v}) \& (NQAC_{i,v} > NQAC_{5,v})$ $Feature_{i,1}^{AC}=1$ else $Feature_{i,1}^{AC}=0$ if $(NQAC_{i,h} > NQAC_{1,h}) \& (NQAC_{i,h} > NQAC_{3,h}) \&$
$(NQAC_{i,h} > NQAC_{6,h}) \& (NQAC_{i,h} > NQAC_{8,h})$ $Feature_{i,2}^{AC}=1$ else $Feature_{i,2}^{AC}=0$ if $(NQAC_{i,v} > NQAC_{1,v}) \& (NQAC_{i,v} > NQAC_{3,v}) \&$
$(NQAC_{i,v} > NQAC_{6,v}) \& (NQAC_{i,v} > NQAC_{8,v})$ $Feature_{i,3}^{AC}=1$ else $Feature_{i,3}^{AC}=0$ Please refer to FIG. 24. For DC coefficients, it is determined which DC coefficient to modify based on a lookup table while embedding feature bits into an image.

Figure 25:
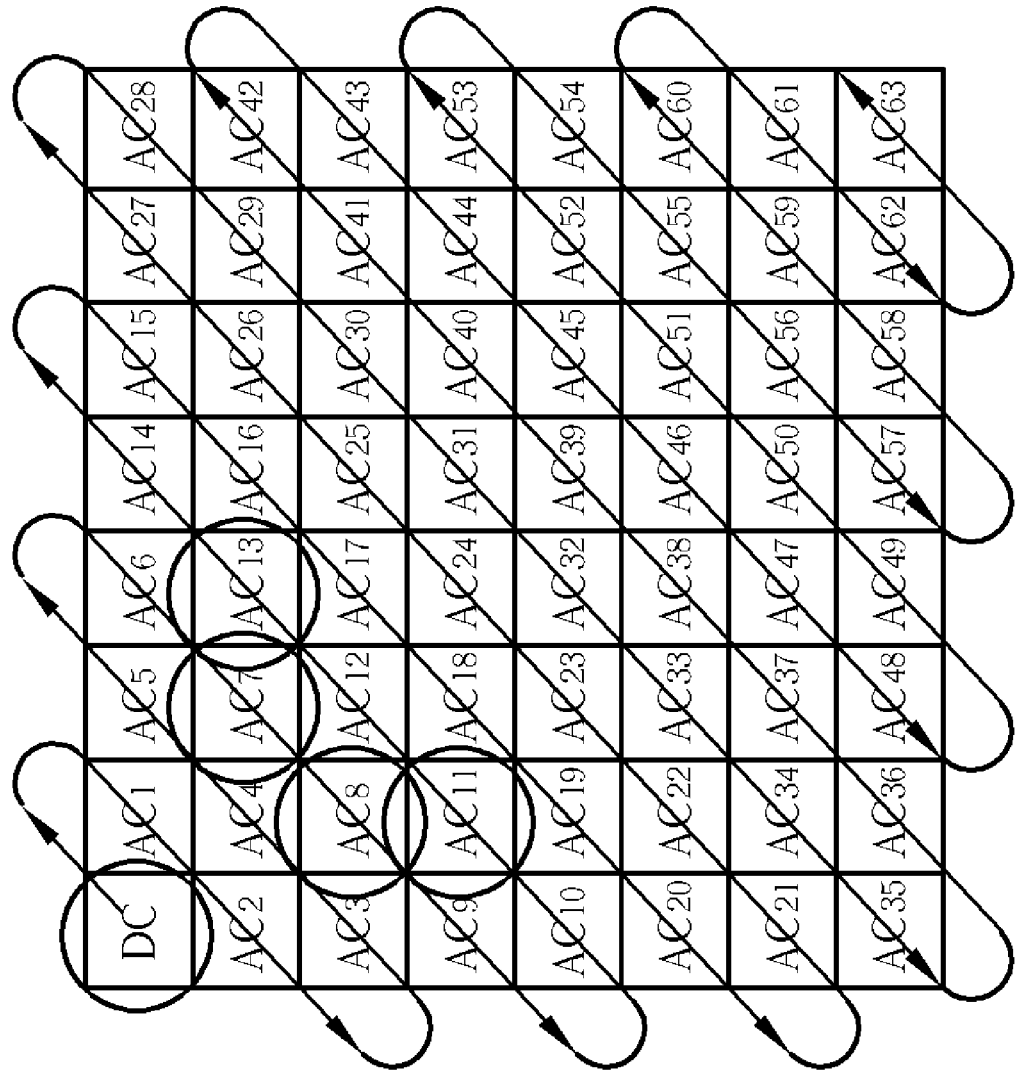
FIG. 25 is a diagram of positions where the selected AC coefficients are embedded according to the present invention.

As for AC coefficients, please refer to FIG. 25. The AC feature bits ($Feature_{i,j}^{AC}$) are embedded into 4 positions ($AC_7$, $AC_8$, $AC_{11}$, $AC_{13}$) of the image.

Take DC coefficients for example. If a DC feature bit is embedded into the kth DC coefficient, the corresponding DCT coefficient will be adjusted based on the kth quantified coefficient of $Q_{LB}$. That is to say, if the embedded feature bit is equal to 1, the corresponding DCT coefficient will be adjusted to $3 \times Q_{LB}(k)$. If the embedded feature bit is equal to 0, the corresponding DCT coefficient will be adjusted to $2 \times Q_{LB}(k)$. In the same manner, the said principle can be applied to AC coefficients. It should be mentioned that the number of AC coefficients that are not equal to 0 ($NQAC_{i,k}$, $k \in \{h,v\}$) may change as AC coefficients change. The present invention utilizes a threshold to solve this potential problem while detecting tampered images.

During image authentication, a method for image authentication is the same as the said embedding method. First, an image is converted into YCbCr color space and the brightness component and the color component of the image are normalized. Next, the image is divided into 8×8 blocks, and the DCT is performed on every block, after which DC and AC feature bits of every block are calculated.

As mentioned above, the present invention utilizes the threshold 't' to solve the said potential problem. The related formula is expressed as follows.

if $(NQAC_{i,h} - NQAC_{2,h}) + (NQAC_{i,h} - NQAC_{7,h}) < 2t$ $Feature_{i,o}^{AC}=1$ else $$Feature_{i,o}^{AC}=0$$

Figure 26:
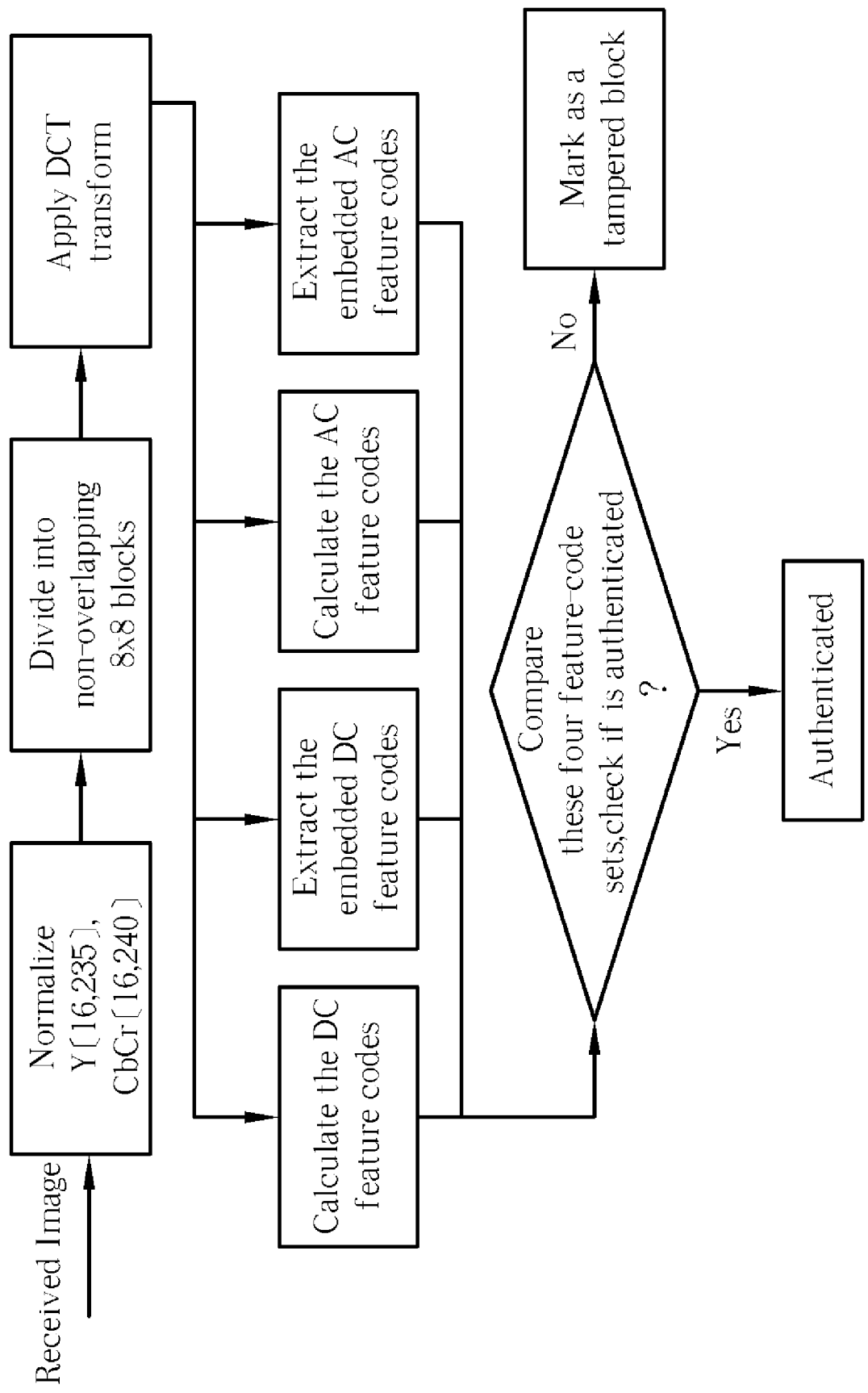
FIG. 26 is a flowchart of an image authentication method according to the present invention.

The threshold 't' is set based on the number of embedded feature bits. According to the present invention, the threshold 't' is preferably set as 1 (please refer to FIG. 26).

Next, extract DC and AC feature bits from the image based on the lookup table shown in FIG. 25.

For the DC coefficients, it is easy to extract the embedded feature bits because the feature bits are embedded into the blocks where the corresponding DC coefficients are located. As for the AC coefficients, it is more complicated to extract the embedded feature bits because the feature bits are embedded into blocks selected at random by the secret key. Therefore, before extracting the embedded AC feature bits, first finding the corresponding blocks via the secret key is necessary.

AS mentioned above, there is an energy-gathering phenomenon present in the DCT coefficients. Therefore, in compression techniques based on DCT, a zigzag scan is a common coefficient-scanning method. The zigzag scan can extract coefficients with higher energy first, and then ignore coefficients with lower energy. As a result, via the zigzag scan, only a small amount of information is needed to show an image.

Other than the zigzag scan utilized by JPEG compression, H.261/H.263 further add an alternate-vertical scan and an alternate-horizontal scan into Intra-Frame coding.

As mentioned above, the present invention stores needed information for restoring the image based on digital signature techniques. First, the horizontal and vertical energy of a block are calculated, k quantified coefficients are extracted from the block in different coefficient scanning methods, differences between coefficients of the block and coefficients of the former block are calculated, and coefficients of the block are stored via DPCM. This method not only reduces the amount of information needed, but also utilizes different coefficient scans according to different block energy distributions to avoid energy loss caused by the zigzag scan that only saves coefficients in the low-frequency zone.

During a procedure for restoring block information, the DCT is first performed on 8×8 blocks of the image. The transformed DC coefficients lie between [−2048, 2047] and the transformed AC coefficients lie between [−1024, 1023]. In general, storing a DC coefficient requires 12 bits, and storing an AC coefficient requires 11 bits. Thus, if a DC coefficient and m AC coefficients of an 8×8 DCT block are selected as restoration information, a single block will require (12+m×11) bits. Therefore, for a 512×512 image, restoration information requires $(2+5\times11)\times2^{12}$ bits to store. For an image, this is too many bits for storing restoration information.

Furthermore, experimental results based on the present invention show that preserving 5 AC coefficients is insufficient to represent the content of the block. Therefore, The present invention utilizes different corresponding bit-reservation patterns according to different block properties.

First, the flatness index of every 8×8 DCT block is calculated. The formula of the flatness index is expressed as follows:

$$F=aF_v+bF_h$$

'$F_v$' and '$F_h$' represent a vertical flatness index and a horizontal flatness index of a block respectively, and 'a' and 'b' are ratio factors for adjusting weighting of '$F_v$' and '$F_h$' to calculate the flatness index of the block. 'a' and 'b' are usually equal to 1, and '$F_v$' and '$F_h$' are defined as follows (FM( ) is a flatness test function for neighboring pixels):

$$F_v = \sum_{i=0}^{7} F_v(i) = \sum_{i=0}^{7}\sum_{j=0}^{6} FM(l_{j+1,i}-l_{j,i}),$$

$$F_h = \sum_{i=0}^{7} F_h(i) = \sum_{i=0}^{7}\sum_{j=0}^{6} FM(l_{i,j+1}-l_{i,j}),$$

$$\text{where } FM(x) = \begin{cases} 1, & x \geq T \\ 0, & x < T \end{cases}$$

In general, the greater the mean square error of the image is, the greater the threshold 'T' is. The threshold 'T' is defined as follows:

$$\sigma^2 = \frac{1}{64}\sum_{i=0}^{7}\sum_{j=0}^{7}(l_{i,j}-m)^2, \quad m = \frac{1}{64}\sum_{i=0}^{7}\sum_{j=0}^{7} l_{i,j}$$

$$T = \sigma^2/b + 1$$

Figure 27:
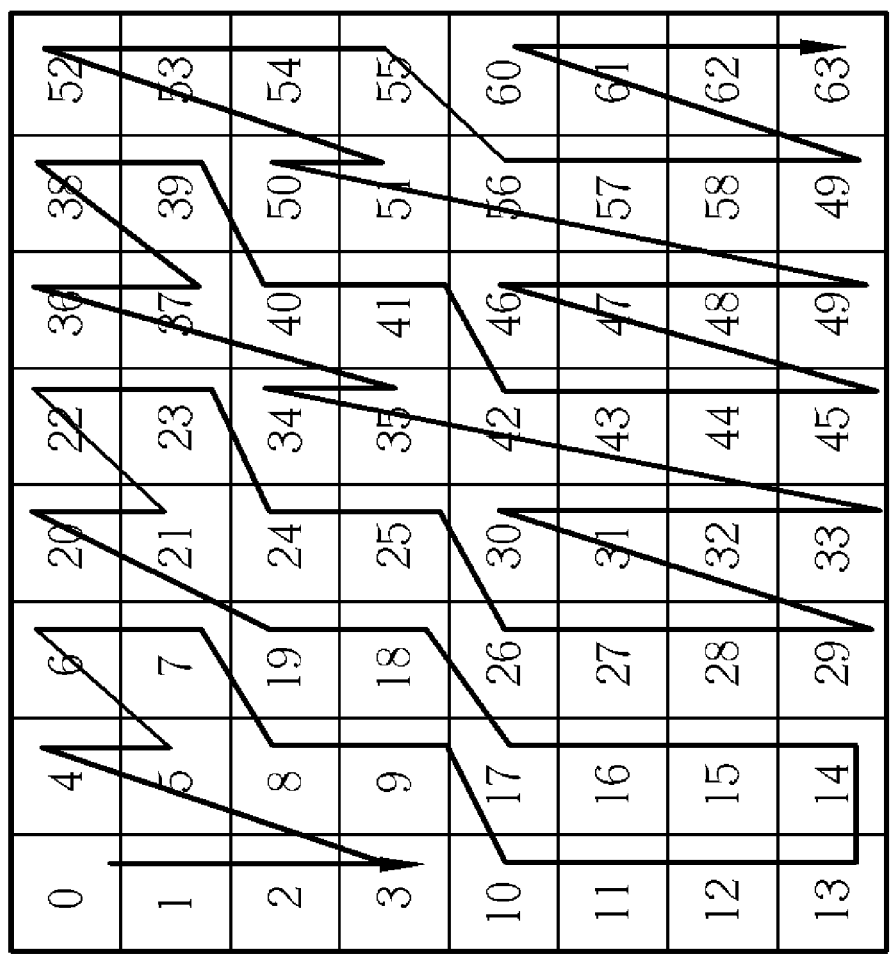
FIG. 27 is a diagram of an alternate-vertical scan according to the present invention.
Figure 28:
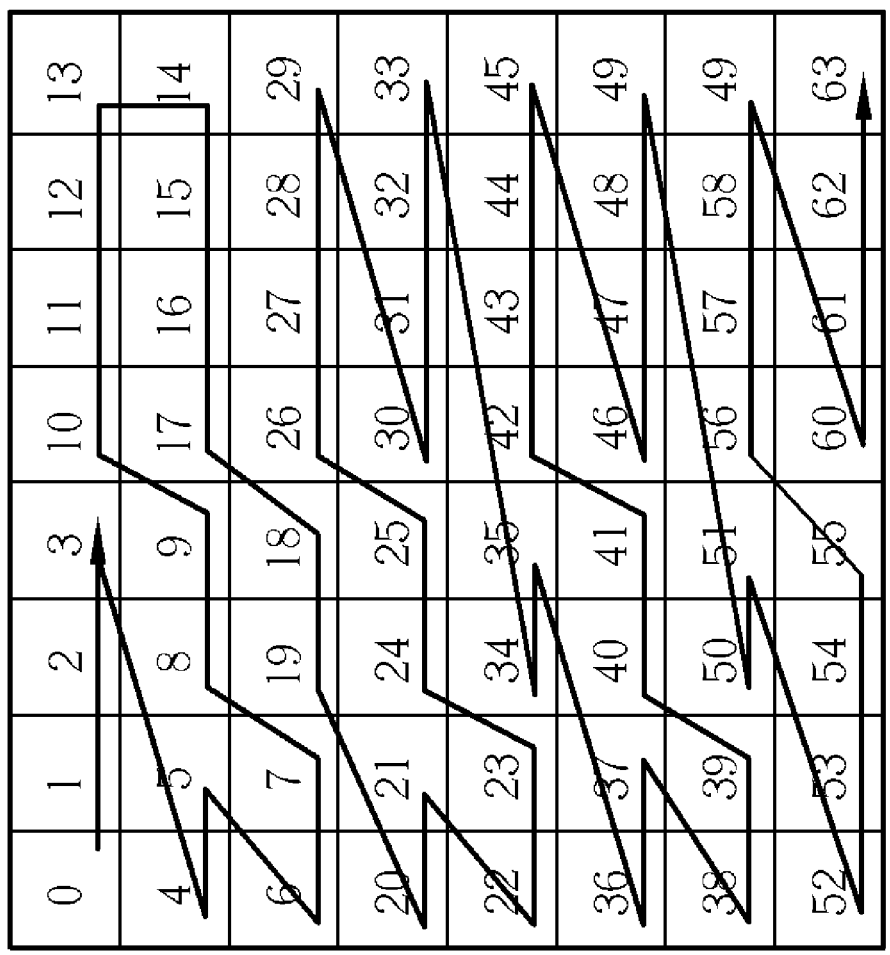
FIG. 28 is a diagram of an alternate-horizontal scan according to the present invention.

If $F_v-F_h>T_r$ and $F_h>T_{r2}$, the present invention utilizes the alternate-vertical scan to select m AC coefficients (please refer to FIG. 27). If $F_h-F_v>T_r$ and $F_v>T_{r2}$, the present invention utilizes the alternate-horizontal scan to select m AC coefficients (please refer to FIG. 28). Otherwise, the block is regarded as a smooth block.

Figure 29:
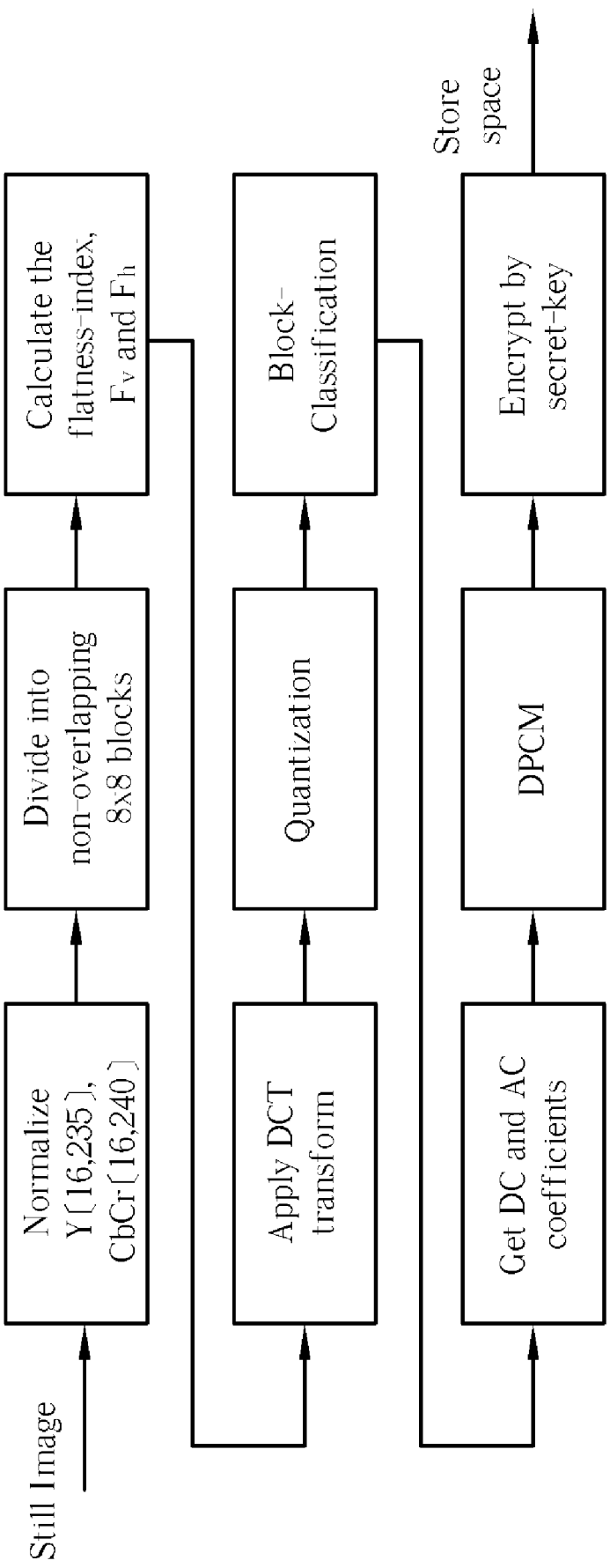
FIG. 29 is a flowchart of an image restoration method according to the present invention.

After extracting the DC coefficients $Restore_i^{DC}$ and the m AC coefficients $Restore_{i,j}^{AC}$ (j=1, 2, . . . , m), differences of $Restore_i^{DC}$ and $Restore_{i-1}^{DC}$ are calculated, and the differences are stored in the restoration information of the block. Next, differences of $Restore_{i,j}^{AC}$ are calculated, and the differences are also stored in the restoration information of the block. Next, a secret key '$Key^R$' is utilized to encrypt the restoration information, and then the restoration information is stored in extra storage (please refer to FIG. 29).

As a result, tampering of an image can be determined according to the restoration information. If a suspicious block is detected in an image, restoration information can be extracted from the digital signature of the image. The restoration information comprises DC coefficients and m AC coefficients of the block, and a block horizontal/vertical determining bit for determining which scan method is appropriate (Alternate horizontal scan or Alternate vertical scan) based on the property of the block. Subsequently, the appropriate scan method is utilized to fill the extracted DC coefficients and m AC coefficients into 8×8 DCT blocks, and then IDCT is performed on each 8×8 DCT block. Finally, the transformed DC coefficients and m AC coefficients are filled into the suspicious block.

The present invention utilizes 12 different images as test samples. In image-quality assessment, the present invention utilizes PSNR (Peak Signal to Noise Ratio) as an assessment basis (the greater PSNR is, the less difference between the original image and the compressed image). The unit of PSNR is dB. PSNR is defined as follows.

$$PSNR = 20\log_{10}\frac{255}{MSE}$$

$$MSE = \frac{\sum [f(i,j)-f'(i,j)]^2}{N^2}$$

wherein MSE is mean square error of the signal before and after embedding information.

In general, PSNR of an image smaller than 25 dB represents that the quality of the image is not good enough. PSNR of an image greater than 35 dB represents that the quality of the image is fair. And when PSNR of an image is greater than 40 dB, difference between the original image and the compressed image will not be detected easily.

Other than PSNR, the present invention also utilizes miss and error detection rates to assess the accuracy of the image authentication method of the present invention. Miss and error detection rates comprise the following definitions:

1. Miss-detection rate: tampering of the image is not detected;

2. Error-detection rate: non-tampered image is regarded as tampered image.

The primary purpose of image authentication is to detect tampered images, so a few erroneous detections are allowable. Therefore, the present invention utilizes miss-detection rate as a major method for assessing the accuracy of the image authentication method of the present invention. Miss-detection rate is defined as follows:

Miss-detection rate=(number of tampered blocks not detected/number of tampered blocks detected)

Furthermore, the present invention utilizes the said flatness index to perform energy distribution analysis. First, the original image is quantified via H.263 (Quantified order is equal to 10). Next, the flatness index of the image is calculated.

Figure 30:
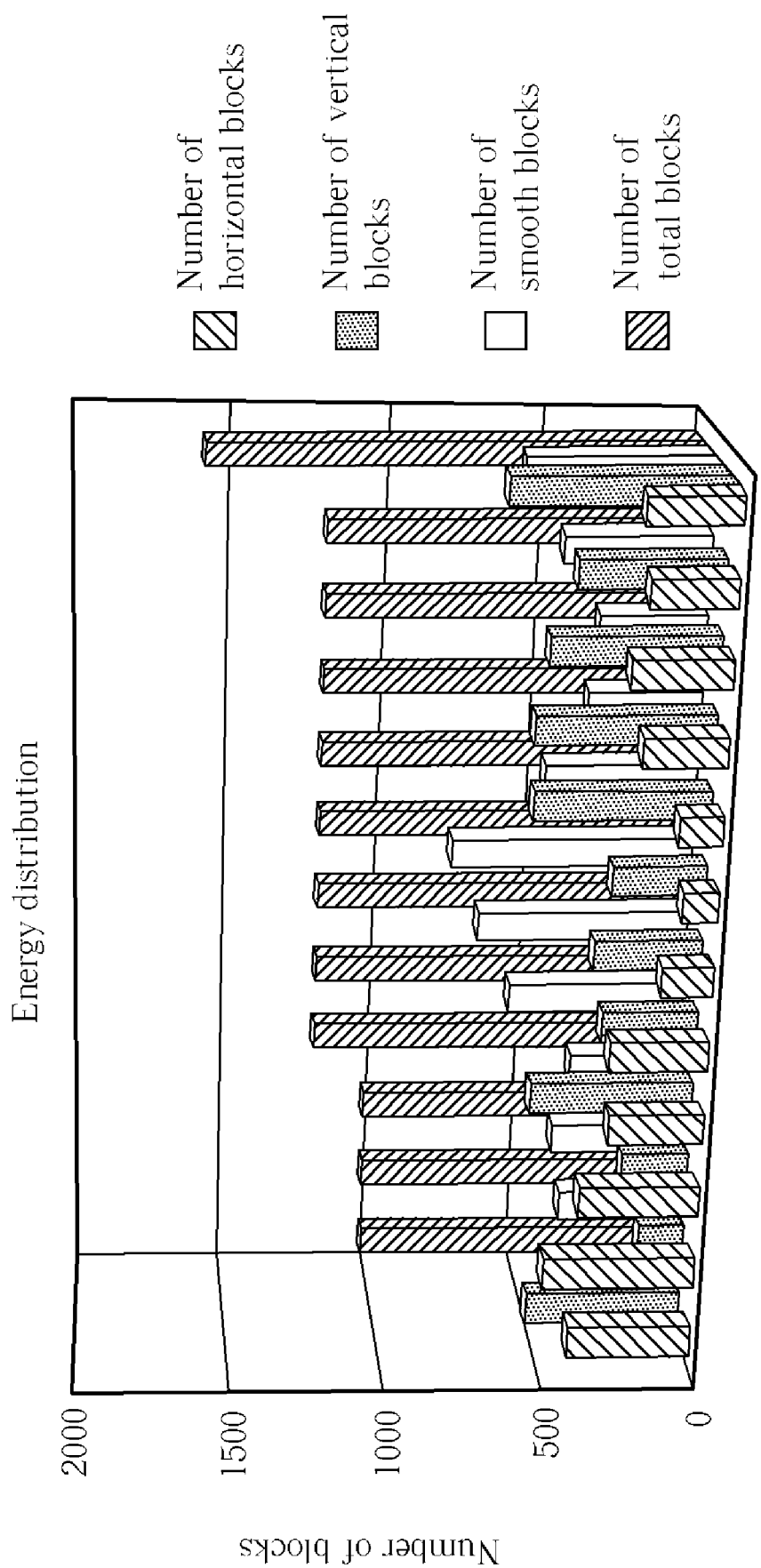
FIG. 30 is an energy distribution statistical chart according to the present invention.

After calculating the flatness index, the image is divided into horizontal, vertical, and smooth blocks. The energy distribution of the said blocks is shown in FIG. 30.

In the present invention, the quality of the watermarked image is the primary consideration. The basic requirement for a digital watermark is that only a few visual differences can exist between the original image and the watermarked image. The present invention can preserve image information efficiently so as to reduce the difference of the original image and the watermarked image.

Figure 31:
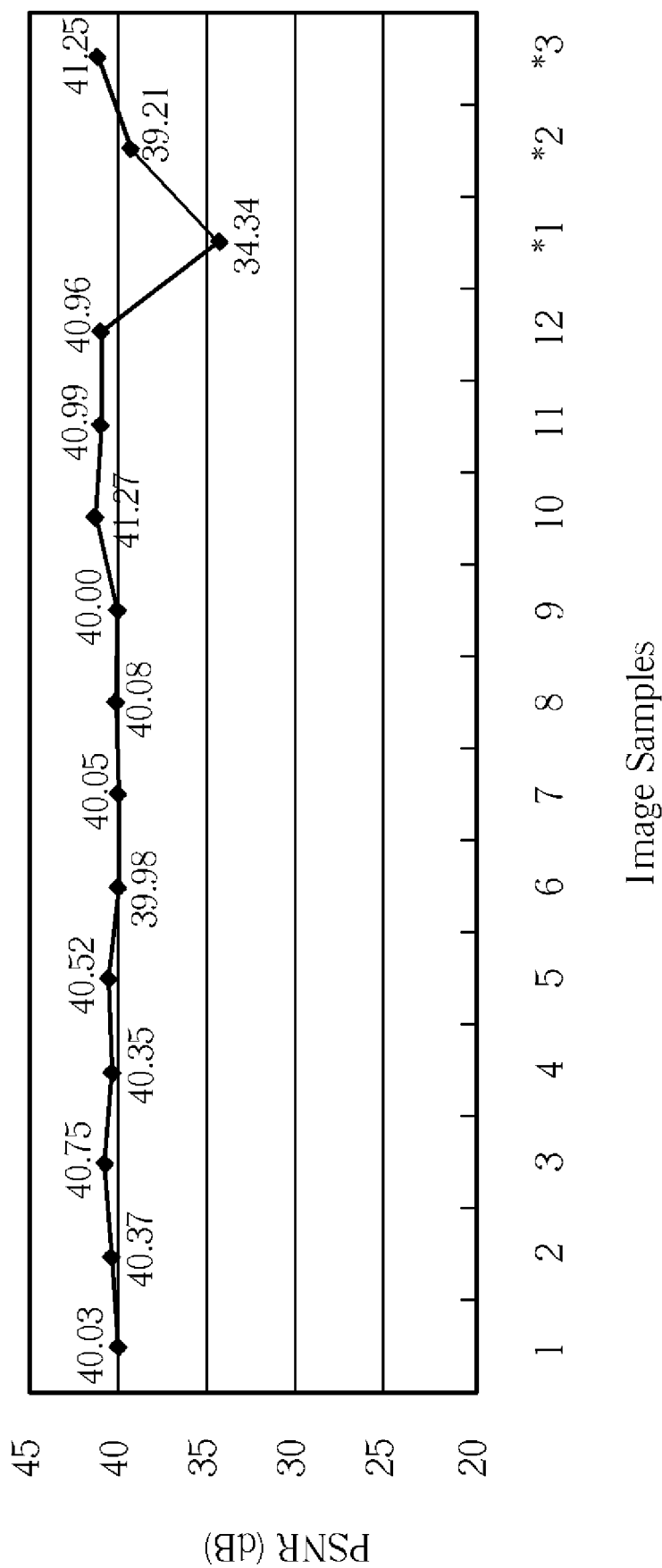
FIG. 31 is a PSNR statistical chart of 12 test images according to the present invention and 3 images according to the prior art (marked as '*').
Figure 32:
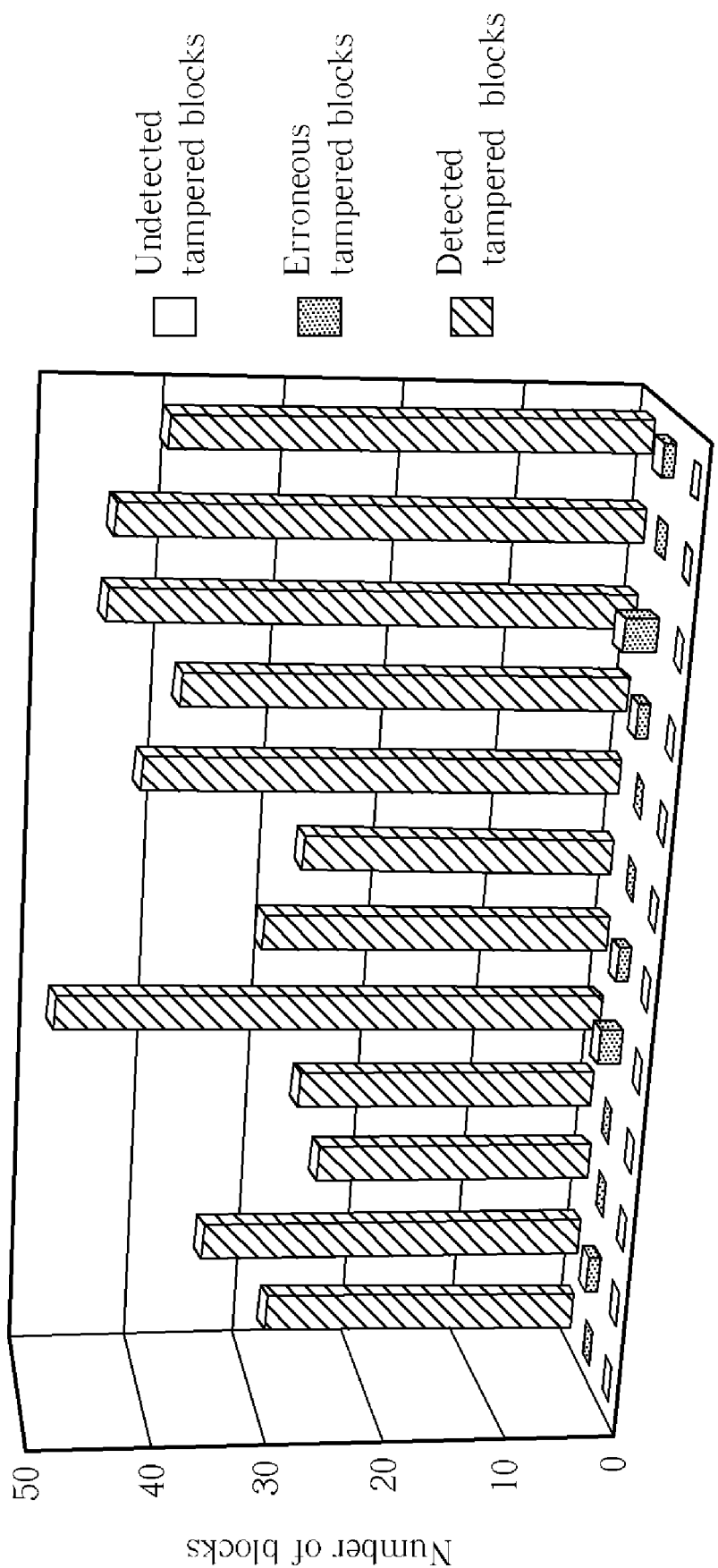
FIG. 32 is an image authentication statistical chart according to the present invention.

Please refer to FIG. 31. FIG. 31 is a PSNR statistical chart of 12 test images based on the present invention and 3 images based on three other methods (marked as '*'). FIG. 32 is an image authentication statistical chart of 12 test images. According to the data shown in FIG. 31 and FIG. 32, it can be seen that the present invention can mark tampered blocks efficiently, reduce miss- and error-detection rates, and restore the tampered blocks approximately to the original blocks.

Methods of image authentication and restoration according to the present invention can be applied to image authentication processing systems and digital video equipment (such as a digital video recorder), and can be suitable for many kinds of compression techniques (such as JPEG series, MPEG series, and H.26x). Furthermore, a computer-readable medium can be utilized for saving function codes so as to make a computer system perform the methods of image authentication and restoration according to the present invention.

Those skilled in the art will readily observe that numerous modifications and alterations of the device and method may be made while retaining the teachings of the invention.

What is claimed is:

1. A method for performing image authentication and restoration comprising:
    converting a selected image into YCbCr color space;
    setting YCbCr coefficients (Y∈{15, 17, . . . , 235}, Cb,Cr∈{16, 17, . . . , 240});
    dividing the selected image into a plurality of non-overlapping 8×8 blocks;
    performing a DCT (Discrete Cosine Transform) on each block;
    calculating DC (Direct Current) and AC (Alternating Current) feature bits of a selected block respectively;
    generating a coefficient set;
    determining whether the coefficient set corresponds to a predetermined rule;
    determining that the selected block is not a tampered image if the coefficient set corresponds to the predetermined rule;
    executing the following steps if the coefficient set does not correspond to the predetermined rule:
    calculating horizontal and vertical flatness indexes of each block;
    sorting the DCT-converted blocks;
    acquiring restoration information of the DC and AC coefficients;
    storing quantified coefficients via DPCM (Differential Pulse Code Modulation);
    encrypting the restoration information of the DC and AC coefficients; and
    embedding the encrypted restoration information into the selected block.

2. The method of claim 1, wherein calculating the DC and AC feature bits of the selected block comprises:
    selecting m blocks adjacent to an ith block as a basis of comparison while taking the ith block as a center;
    setting a distance between each block as 'Distb', wherein the value of Distb being equal to 1 represents that the selected range is a 3×3 region, and the greater the value of Distb is, the lower a correlation of each block is; and
    calculating differences of the DC and AC coefficients of the ith block and the other m blocks, wherein if the differences are greater than a set threshold, the DC and AC feature bits are equal to 1, else the DC and AC feature bits are equal to 0.

3. The method of claim 1, wherein the horizontal and vertical indexes are defined as $F=aF_v+bf_h$, wherein 'a' and 'b' represent ratio factors, and 'Fv' and 'Fh' are defined respectively as $$F_v = \sum_{i=0}^{7} F_v(i) = \sum_{i=0}^{7}\sum_{j=0}^{6} FM(1_{j+1,i} - l_{j,i}),$$

$$F_h = \sum_{i=0}^{7} F_h(i) = \sum_{i=0}^{7}\sum_{j=0}^{6} FM(l_{i,j+1} - l_{i,j}),$$

$$\text{where } FM(x) = \begin{cases} 1, & x \geq T \\ 0, & x < T \end{cases}$$

wherein FM(x) represents a flatness test function of neighboring pixels and 'T' is $$\sigma^2 = \frac{1}{64}\sum_{i=0}^{7}\sum_{j=0}^{7}(l_{i,j} - m)^2, \quad m = \frac{1}{64}\sum_{i=0}^{7}\sum_{j=0}^{7} l_{i,j}$$

a threshold defined as $T=\sigma^2/b+1$,
and m AC coefficients are selected via an alternate-vertical scan when $F_v-F_h>Tr$ and $F_h>Tr_2$, or via an alternate-horizontal scan when $F_h-F_v>Tr$ and $F_v>Tr_2$.

* * * * *